United States Patent
Suzuki et al.

(10) Patent No.: US 6,621,367 B2
(45) Date of Patent: *Sep. 16, 2003

(54) SIGNAL POWER DYNAMIC RANGE COMPRESSING CIRCUIT AND POWER AMPLIFIER USING THE SAME

(75) Inventors: Yasunori Suzuki, Yokohama (JP); Motoyuki Uchida, Yokosuka (JP); Toshio Nojima, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 09/749,807

(22) Filed: Dec. 28, 2000

(65) Prior Publication Data

US 2001/0006359 A1 Jul. 5, 2001

(30) Foreign Application Priority Data

Dec. 28, 1999 (JP) .............................. 374215/99

(51) Int. Cl.[7] .............................. H04B 1/64; H04B 3/04; H03G 7/00; H03G 11/00
(52) U.S. Cl. ..................... 333/14; 333/17.1; 333/17.2; 333/109; 330/107; 330/136; 455/72
(58) Field of Search .................. 333/14, 109, 17.1, 333/17.2; 330/107, 136; 455/72

(56) References Cited

U.S. PATENT DOCUMENTS

| | | | | |
|---|---|---|---|---|
| 5,471,651 A | * | 11/1995 | Wilson | 455/72 |
| 5,742,201 A | * | 4/1998 | Eisenberg et al. | 330/2 |
| 5,796,307 A | * | 8/1998 | Kumagai et al. | 330/149 |
| 6,392,483 B2 | * | 5/2002 | Suzuki et al. | 330/151 |
| 6,480,705 B1 | * | 11/2002 | Kusunoki | 455/126 |

FOREIGN PATENT DOCUMENTS

JP 4-96508 * 3/1992 ................. 330/149

* cited by examiner

*Primary Examiner*—Barbara A Summons
(74) *Attorney, Agent, or Firm*—Oblon, Spivak, McClelland, Maier & Neustadt, P.C.

(57) ABSTRACT

In an input signal power dynamic range compressing circuit, an input signal is distributed by a directional coupler to a linear signal transfer path and a compressing signal generating path, and in the compressing signal generating path a compressing signal, which keeps the peak-to-average-power ratio of the input signal below a predetermined value, is generated from the input signal. The compressing signal is combined by a power combiner with the input signal having passed through the linear signal transfer path.

23 Claims, 19 Drawing Sheets

SIGNAL POWER DYNAMIC RANGE COMPRESSING CIRCUIT AND POWER AMPLIFIER USING THE SAME

BACKGROUND OF THE INVENTION

The present invention relates to a circuit for compressing the dynamic range of the power of input signals to a transmitting signal amplifier and a receiving amplifier, and a power amplifying circuit using the dynamic range compressing circuit.

Recently multi-carrier radio communication schemes are widespread which permit high-speed transmission possible the use of plural narrow-band carriers. As compared with a single-carrier high-speed transmission, the multi-carrier high-speed transmission is less susceptible to fading or some other influences of changes in the propagation path, and hence is more robust against delay waves. Furthermore, the multi-carrier system possesses the advantages of simplifying radio circuitry and relaxing the requirements imposed on the radio circuit used.

The multi-carrier radio communication schemes, thus suitable for the high-speed transmission, have been practiced in fixed microwave communication systems and multi-channel access systems.

In recent years there has been proposed an OFDM (Orthogonal Frequency Division Multiplexing) radio communication scheme intended for high-speed transmission in the microwave band such as 5-GHz band on IEEE802. 11. In the field of broadcasting the application of the OFDM system to the next-generation digital television is now under study.

These multi-carrier radio communication schemes contain various features, but have such problems as an increase in out-of-band leakage power due to intermodulation distortion and the occurrence of intersymbol interference by nonlinearity of transmitters. The intermodulation distortion on transmitters occurs, for example, in a frequency converter or power amplifier. In particular, the influence of the non-linearity of the power amplifier is great. In general, simultaneous amplification of multi-carrier will generate the intermodulation distortion if no output back-off is provided corresponding to PAPR (Peak-to-Average Power Ratio). Accordingly, the power amplifier for the multi-carrier transmission needs to be sufficiently high saturation output. Usually, the power amplifier becomes bulky and expensive with an increase in the saturation output because it involves an increase of the power supply and upsizing of radiation fins.

Heretofore, 4-carrier 16-QAM and 4-carrier 256-QAM systems have been put into use in the fixed microwave communication. The power amplifier in these systems combines individually amplified signals by a signal multiplexer having a quarter-wave line. The individual amplification of plural carriers is intended to avoid the problem of increased PAPR resulting from the multiplexing of the plural carriers.

Schemes that have been proposed so far to suppress PAPR in the multi-carrier transmission are: a scheme for setting initial phases of carriers (Shoichi NARAHASHI and Toshio NOJIMA, "A New Phasing Scheme for Multitone Signal systems to Reduce Peak-to-Average-Power Ratio (PAPR)," The Institute of Electronics, Information and Communication Engineers Transaction on B-II, Vol.J78-B-II, No. 11, pp.663–671, Nov., 1955); a scheme using a specific signal pattern that produces no peak (U.S. Pat. No. 5,381,449, "Peak-to-average-power ratio reduction methodology for QAM communications system); a scheme using an error correcting code (T. A. Wilkinson and A. E. Jones, "Minimisation of the peak to mean envelope power ratio of multicarrier transmission schemes by block coding," in Proc. 45th IEEE Vechi. Technol. Conf., pp.825–829, 1995); a scheme of multiplexing peak power suppressing signals (Shigeru TOMOSATO and Hiroshi SUZUKI, "A Smooth Envelope Parallel Modulation/Demodulation Scheme," Technical Report of IEICE, RCS 95-77, Sep., 1995); and a scheme using orthonormal transformation (Japanese Patent Application Laid-Open Gazette No. 10-178411, corresponding U.S. patent application Ser. No. 08/948,090). In particular, there are known, as PAPR suppression schemes for OFDM, a scheme of clipping a multiplexed signal waveform (X. Li and L. J. Cimni, Jr., "Effects of Clipping and Filtering on the Performance of OFDM," in Proc., 47th IEEE Vechi. Technol. Conf., pp.1634–1638, 1997) and a scheme of effecting transmitting output control according to peak power (Yoichi MATSUMOTO, Nobuaki MOCHIZUKI and Masahiro UMEHIRA, "A Novel Peak Power Reduction Technique for Broadband Microcellular OFDM systems," Technical Report of IEICE, RCS 97-143, Oct., 1997).

The requirement for PAPR reduction in the multi-carrier radio communication is to prevent degradation of transmission performance without increasing the out-of-band power leakage. In terms of this requirement, the clipping of a multiplexed signal waveform causes an increase in the out-of-band power leakage. The control of the transmitting output according to peak power encounters difficulty in maintaining channel quality. The initial phase setting scheme is difficult to apply to a modulated wave of ever-changing phase. The utilization of orthonormal transformation is defective in that phase fluctuations of carriers degrade the inter-carrier orthogonality, resulting in the development of peak power. The use of an error correcting code and the multiplexing of peak power suppressing signals both involve enlargement of the transmission band. Thus, the conventional PAPR reduction schemes have such problems as the enlargement of the transmission band, difficulty in the application to modulated waves, an increase in the out-of-band distortion and difficulty in maintaining channel quality.

And, peak power reduction schemes applicable to modulated waves all involve signal processing of suppressing the peak power at the transmitting side and signal processing of reconstructing the received signal at the receiving side. To allow ease in the fabrication of a peak power suppressing circuit and achieve high-efficiency amplification that permits reduction in the size, weight and power consumption of the power amplifier, it is desirable to use a peak power suppression scheme that can be carried out within only the transmitting side as much as possible. In this respect, the initial phase setting scheme and a scheme using a PAPR reduction signal point are effective, but the former is difficult to apply to modulated waves and the latter is limited in the application to transmitting signal sequences.

SUMMARY OF THE INVENTION

It is therefore an object of the present invention is to provide an input signal power dynamic range compressing circuit that develops no out-of-band power leakage of the input signal thereto and permits effective compression of the signal power dynamic range irrespective of phase variations of the input signal, and a power amplifying circuit using the dynamic range compressing circuit.

The signal power dynamic range compressing circuit according to the present invention comprises:

a directional coupler for dividing an input signal into two signals:

a linear signal transfer path over which to linearly transfer the one of the two divided input signals;

a compressing signal generating path for generating a compressing signal that contains a component opposite in phase to the other distributed input signal; and a power combiner for power-combining output signals from the linear signal transfer path and the compressing signal generating path.

A power amplifier is connected to the output of the signal power dynamic range compressing circuit to form a power amplifying circuit.

DETAILED DESCRIPTION OF THE PREFERRED EMBODIMENTS

Figure 1:
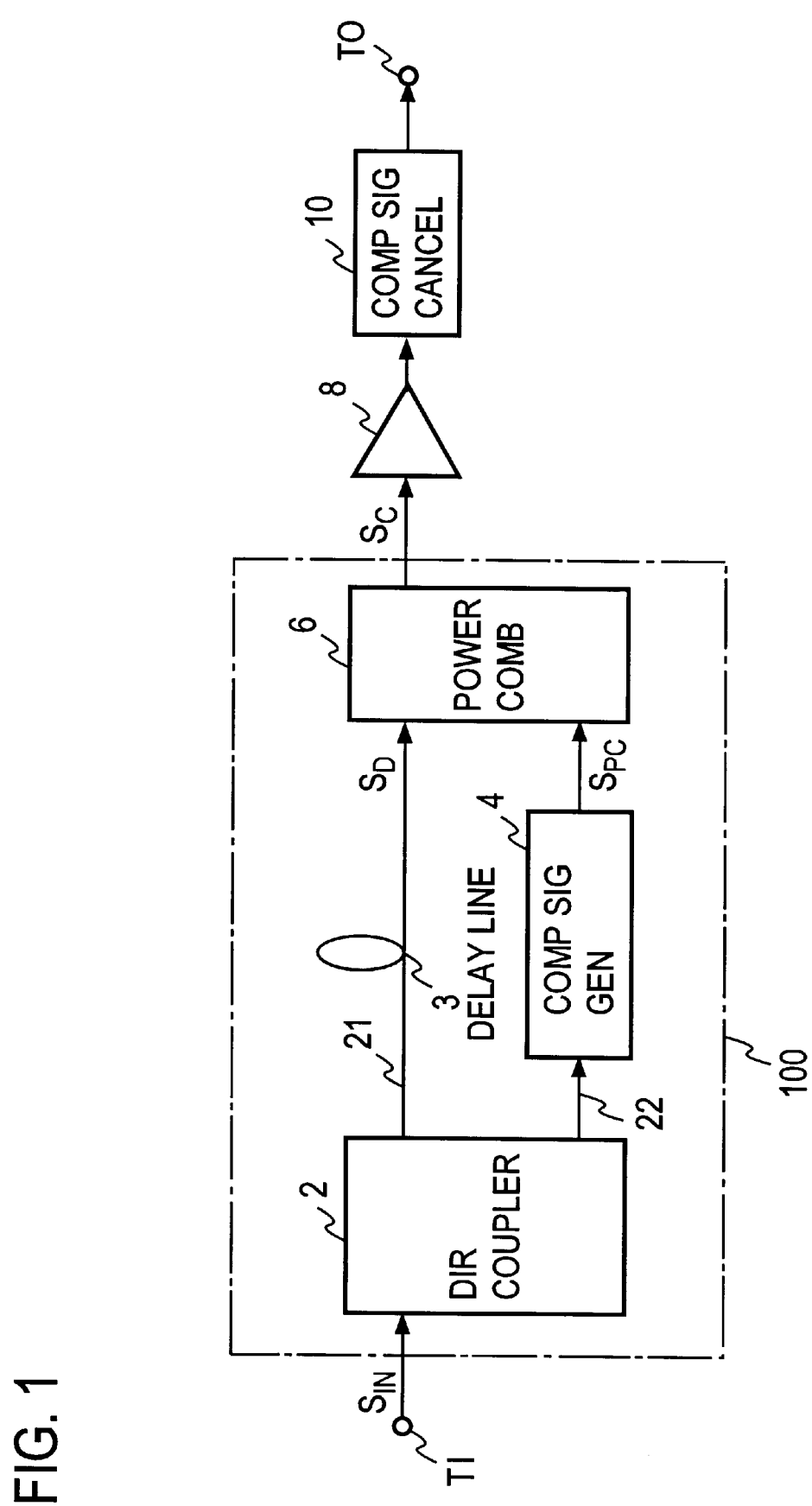
FIG. 1 is a block diagram illustrating the basic configuration of the present invention.

In FIG. 1 there is depicted in block form the basic configuration of the signal power dynamic range compressing circuit according to the present invention and the power amplifying circuit using it.

In FIG. 1, the signal power dynamic range compressing circuit, indicated generally by 100, comprises a directional coupler 2, a linear signal transfer path 21, a compressing signal generating path 22, and a power combiner 6. FIG. 1 depicts the case where the output of the power combiner 6 is connected to a power amplifier 8 to form a power amplifying circuit. The directional coupler 2 divides an input signal $S_{IN}$ at an input terminal TI to the two paths 21 and 22. The directional coupler 2 may be a power divider, but the following embodiments will be all described to use the directional coupler 2. The one path 21 is a linear signal transfer path formed by a delay line 3, whereas the other path 22 is a compressing signal generating path containing a compressing signal generator 4. The compressing signal generator 4 detects the power of the input signal $S_{IN}$, and generates a signal for compressing the output back-off of the power amplifier 8 (which signal will hereinafter be referred to as a compressing signal) $S_{PC}$. The compressing signal $S_{PC}$ is combined by the power combiner 6 with an output $S_D$ from the delay line 3 to form a combined signal $S_C$ for compressing the output back-off of the power amplifier 8. The combined signal $S_C$ is applied to the power amplifier 8, and the compressing signal $S_{PC}$ injected at the input thereof is eliminated by a compressing signal canceling circuit 10 connected to the output of the power amplifier 8.

Figure 2:
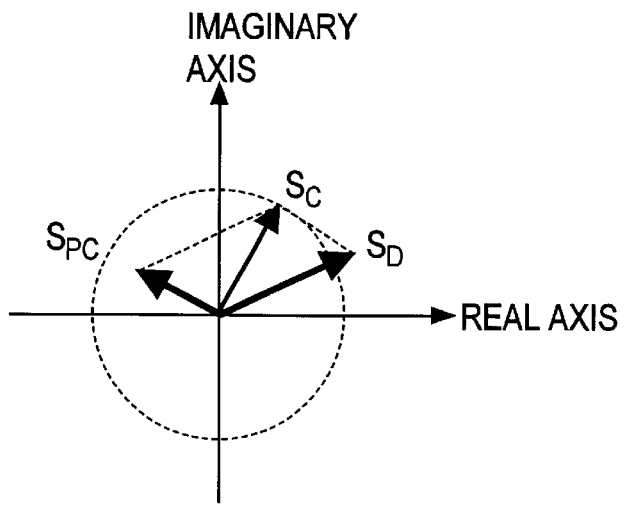
FIG. 2 is a diagram showing the vector of the input to a power amplifier, for explaining the principle of operation of the present invention.

Referring next to FIG. 2, a description will be given of the principle of operation of the present invention. FIG. 2 depicts the vector of the input signal to the power amplifier 8 in the case where respective modulated signals were subjected to orthogonal detection.

The compressing signal generating circuit 4 is a circuit that generates the compressing signal $S_{PC}$ whose vector $S_{PC}$ is combined with the output vector $S_D$ of the linear signal transfer path 21 into the combined vector $S_C$. As described later on, there are two kinds of such compressing signal generating circuits: a circuit for generating the compressing signal $S_{PC}$ that compresses the peak power of the input signal and a circuit for generating the compressing signal $S_{PC}$ that compresses the peak-to-average-power ratio.

In the case of suppressing the peak power, the compressing signal generator 4 generates the compressing signal vector $S_{PC}$ that is nearly 180° out of phase with the input signal vector $S_{IN}$ (and consequently the signal vector $S_D$ corresponding thereto) as depicted in FIG. 2. The compressing signal vector $S_{PC}$ is produced, as described later on, by detecting the peak power of the amplifier input signal, then detecting the amplitude and phase of the input signal and generating a vector having the amplitude of the signal vector $S_D$ held constant. In the example of FIG. 1, a tone signal (a single-frequency signal) 180° out of phase with the input signal is generated by a low-frequency oscillator in the compressing signal generator 4. As a result, the magnitude of the combined vector by the directional coupler 6 can be made constant. Having thus generated the compressing signal $S_{PC}$, the compressing signal generator 4 holds its output until the next detection of a peak power equal to or larger than a preset threshold value. In this way, upon each detection of the peak power, the vector nearly 180° out of phase with the input signal is generated and combined with the output signal $S_D$ from the linear signal transfer path 21 to obtain the combined signal $S_C$ having its peak power suppressed, and the combined signal $S_C$ is applied to the power amplifier 8. By such reduction of the peak power of the input signal, it is possible to obtain the combined signal $S_C$ in which the power dynamic range of the input signal $S_{IN}$ is suppressed within a desired range.

Figure 3:
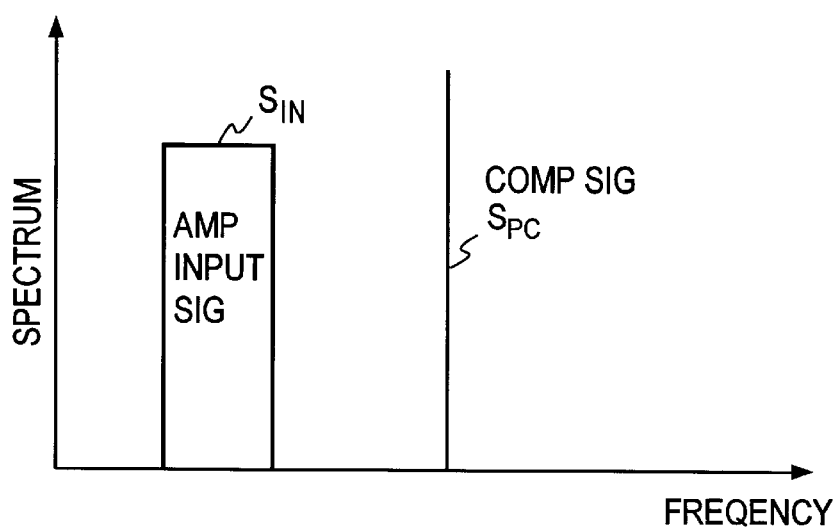
FIG. 3 is a graph depicting the spectrum of the input signal to the power amplifier.
Figure 4:
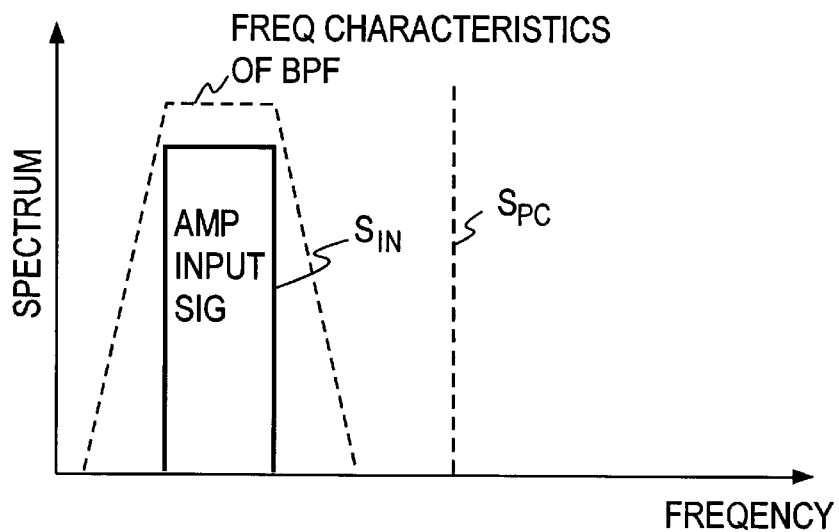
FIG. 4 is a graph showing the spectrum of an output signal from the power amplifier.

The compressing signal $S_{PC}$ by the compressing signal generator 4 is a single-frequency signal (which will hereinafter be referred to also as a tone signal). The compressing signal $S_{PC}$ is frequency-converted to a band different from or identical with that of the input signal $S_{IN}$. FIG. 3 depicts an example in which the compressing signal $S_{PC}$ is frequency-converted to a different band from that of the input signal $S_{IN}$. As shown, the input signal $S_{IN}$ of amplifier and the compressing signal $S_{PC}$ lie in different bands. FIG. 4 depicts the output spectrum of the power amplifier 8. If necessary, a band-pass filter (BPF) is provided as the compressing signal canceller 10 at the output side of the power amplifier 8 so that the compressing signal injected at the input side of the power amplifier 8 is eliminated by the frequency characteristic of the band-pass filter.

In this way, the peak power of the transmitting signal is suppressed, then its power is amplified by the power amplifier 8, and the component of the compressing signal $S_{PC}$ is eliminated by the band-pass filter 10, by which it is possible to offer a peak power reduction scheme that is completed within the transmitting circuit. Accordingly, the suppression of the peak power of the input to the power amplifier 8 reduces its output back-off, permitting high-efficiency amplification. Of course, the vector of the compressing signal that is generated in the interval between the points of detection of the peak power of the input signal is held constant, but the input signal vector varies; therefore, their combined vectors do not always become constant.

While FIGS. 3 and 4 are shown to use a tone signal, a modulating wave can be used as the compressing signal $S_{PC}$.

Next, a description will be given of the operation of the compressing signal generator 4 in the case of suppressing the PAPR. The basic principle of operation is the same as that for suppressing the peak power, but the compressing signal $S_{PC}$ is used to reduce the PAPR of the input signal $S_{IN}$ in this instance. The generation of the compressing signal $S_{PC}$ begins with the detection of the PAPR of the input signal $S_{IN}$, and if the detected ratio is equal to or higher than a preset value, the vector of the compressing signal $S_{PC}$ is determined by the compressing signal generator 4 so that the PAPR of the combined signal $S_C$ is equal to or lower than a prescribed value. As a result, the combined signal $S_C$ can be obtained by suppressing the PAPR of the input signal $S_{IN}$. The signal $S_{PC}$ for suppressing the PAPR is frequency-converted to a different band from or identical with that of the input signal $S_{IN}$. The compressing signal $S_{PC}$ can be cancelled, if necessary, by the band-pass filter 10 at the output side of the power amplifier 8. To reduce the PAPR of the input signal $S_{IN}$, the vector of the compressing signal $S_{PC}$ is determined in such a manner as to increase and/or decrease the average power relative to, for example, the peak power.

The compressing signal $S_{PC}$ for suppressing the PAPR may be generated so that the amplitude of the combined signal $S_C$ takes a predetermined fixed value sufficiently smaller than a predicted peak of the input signal $S_{IN}$. FIG. 2 shows the locus of the signal in an IQ plane which is obtained by the orthogonal detection of the combined signal $S_C$. In this case, the envelope of the combined signal $S_C$ takes a constant value as indicated by the circle in FIG. 2. In the embodiments described later on this compressing signal $S_{PC}$ is called a constant envelope signal.

Such reduction of the PAPR of the transmitting signal permits suppression of the input signal power dynamic range of the power amplifier 8. Further, it is possible to provide a PAPR suppression scheme that is completed within the transmitting circuit. Besides, the suppression of the PAPR of the amplifier input signal reduces the output back-off, allowing high-efficiency amplification.

FIRST EMBODIMENT

Figure 5:
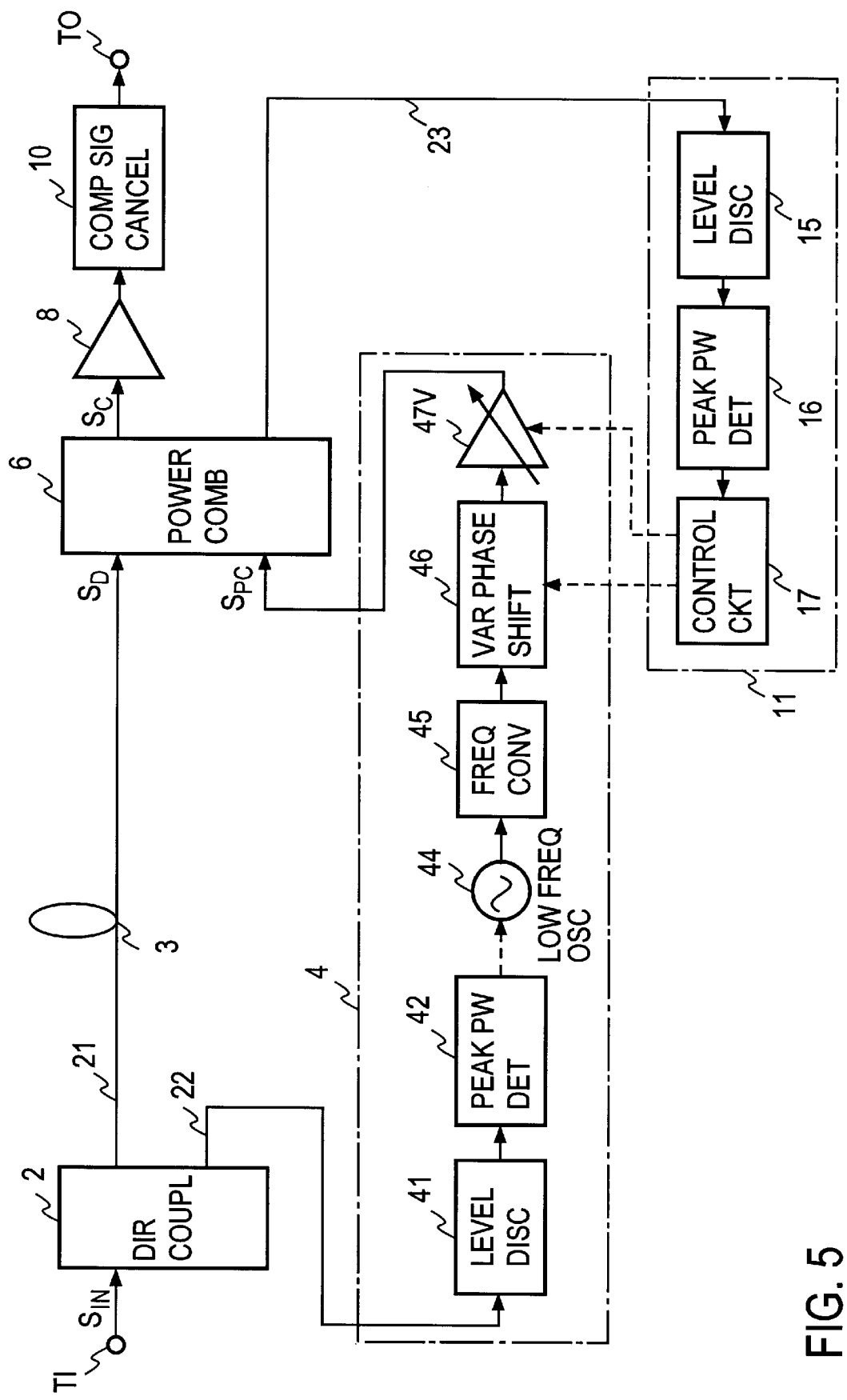
FIG. 5 is a block diagram illustrating a first embodiment of the present invention.

FIG. 5 illustrates in block form a first embodiment of the present invention in which the basic configuration of the signal power dynamic range compressing circuit shown in FIG. 1 is applied to the peak power suppression. The amplifier input signal $S_{IN}$ is divided by the directional coupler 2 to the linear signal transfer path 21 formed by the delay line 3 and the compressing signal generating path 22 formed by the compressing signal generator 4. The compressing signal generator 4 is formed by a cascade connection of a level discriminator 41, a peak power detector 42, a low-frequency oscillator 44, a frequency converter 45, a variable phase shifter 46 and a variable amplifier 47 V. The level discriminator 41 observes an instantaneous value of the amplitude of the distributed input signal $S_{IN}$. The observed instantaneous value is compared with a threshold value preset in the level discriminator 41, and only when the former is equal to or larger than the latter, the distributed input signal $S_{IN}$ is fed to the peak power detector 42. The peak power detector 42 is formed by an orthogonal demodulator, which performs orthogonal detection of the input signal $S_{IN}$ fed from the output of the level discriminator 41, detecting the vector (amplitude and phase values) of the input signal $S_{IN}$. The thus detected amplitude and phase values are input to the low-frequency oscillator 44.

The low-frequency oscillator 44 is formed by a synthesizer in which the amplitude and phase values can be set. To suppress the input power dynamic range of the power amplifier 8, the low-frequency oscillator 44 is set so that its oscillation signal is nearly 180° out of phase with the detected phase value; that is, the phase that is set in the low-frequency oscillator 44 is opposite to the phase detected by the peak power detector 42. And the amplitude value is chosen such that the combined signal $S_C$ estimated by the peak power detector 42 through numerical calculations will have a constant envelope. This permits generation of the compressing signal $S_{CC}$ of a vector that suppresses the peak power. The synthesizer output is frequency-converted by the frequency converter 45 to a predetermined band, which may be the same as or different from the band of the amplifier input signal $S_{IN}$. The frequency-converted compressing signal is subjected to final adjustments of its amplitude and phase by the variable phase shifter 46 and the variable amplifier 47 V. The thus finally adjusted compressing signal $S_{PC}$ is combined in power by the power combiner 6 with the signal $S_D$ from the delay line 3. As the result of this, the peak power of the input signal is reduced. In this embodiment the power combiner 6 divides the combined signal $S_C$. The power of the combined signal $S_C$ is mostly distributed to the power amplifier 8 and partly to a control path. The variable amplifier 47 V may also be composed of a variable attenuator and an amplifier.

In the basic configuration depicted in FIG. 1, upon detection of the peak power of the input signal $S_{IN}$, it is suppressed by the compressing signal $S_{PC}$ opposite in phase thereto, but since the vector of the input signal $S_{IN}$ varies with time, there is the possibility that the instantaneous amplitude value of the combined signal $S_C$ exceeds the afore-mentioned predetermined threshold value before the next peak power of the input signal $S_{IN}$ is detected by the level discriminator 41.

To avoid this, the FIG. 5 embodiment uses a compressing signal adjustment part 11 in the control path 23 by which to keep the level of the combined signal $S_C$ from exceeding the threshold value. The compressing signal adjustment part 11 is formed by a cascade connection of a level discriminator 15, a peak power detector 16 and a control circuit 17. The level discriminator 15 decides whether the peak power of the distributed combined signal $S_C$ is in excess of a predetermined threshold value, and if so, transfers the combined signal $S_C$ to the peak power detector 16. The peak power detector 16 performs orthogonal detection of the combined signal $S_C$ fed thereto to detect its phase and amplitude, and provides them to the control circuit 17. Based on the phase and amplitude thus detected, the control circuit 17 controls the phase shift amount of the variable phase shifter 46 and the amplification factor of the variable amplifier 47 V by an adaptive algorithm on a stepwise basis so that the peak power of the combined signal $S_C$ becomes smaller than the threshold value.

The control circuit 17 is formed by a microcomputer, which controls the variable phase shifter 46 and the variable amplifier 47 by a perturbation algorithm, least square estimation algorithm, or the like. The control operation of the control circuit 17 may be implemented by a digital or analog circuit. The variable amplifier 47 V may be replaced with a variable attenuator, which produces the same peak voltage suppression effect. The amplitude and phase values of the low-frequency oscillator 44 may also be placed under the control of the control circuit 17.

According to this embodiment, since the power dynamic range of the input signal $S_{IN}$ can be reduced by the adaptive suppression of its peak power, the output back-off of the power amplifier 8 can be reduced. This enables the power amplifier 8 to achieve high-efficiency amplification.

Figure 6:
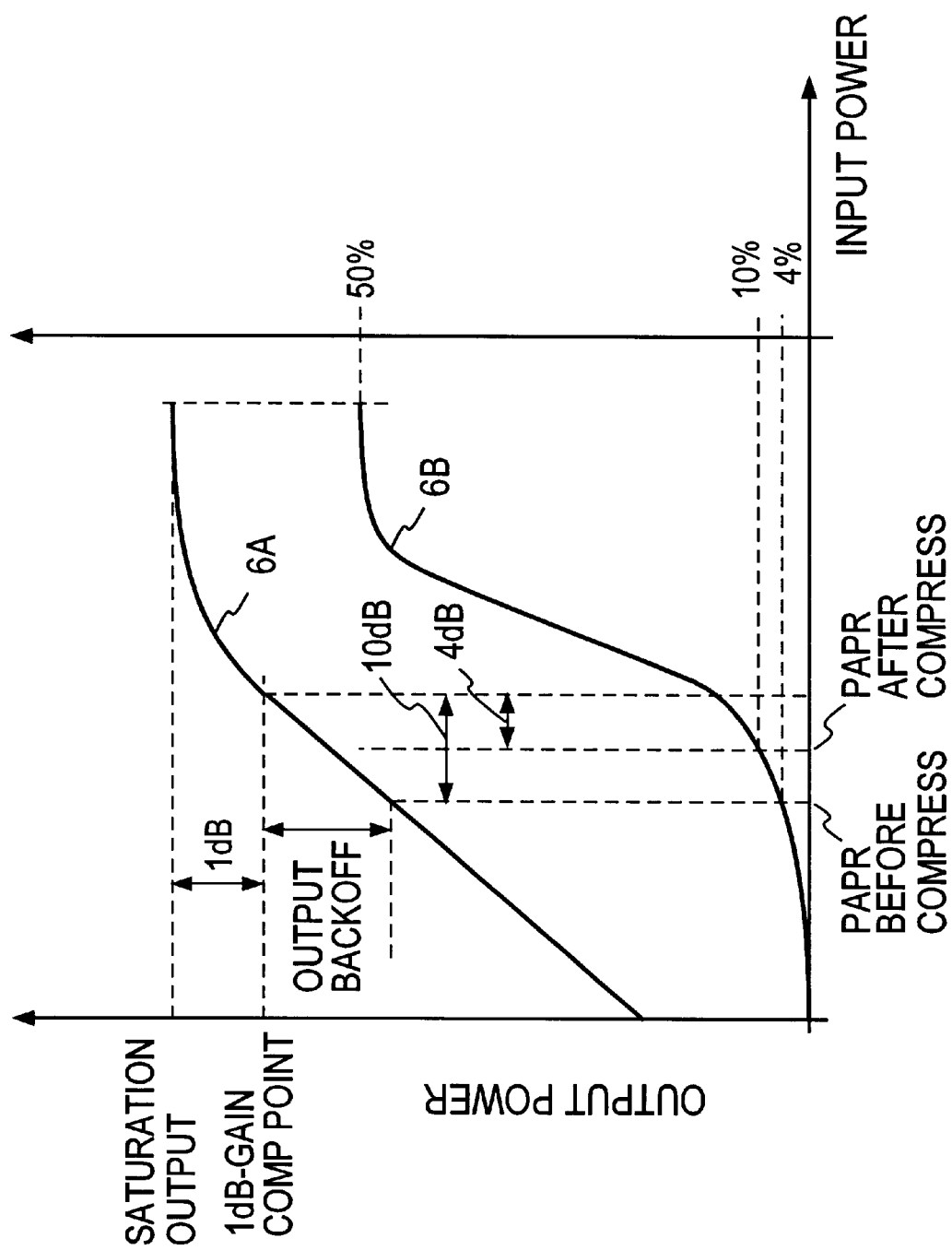
FIG. 6 is a graph conceptually showing operation characteristics, for explaining the amplification efficiency of a power amplifier embodying the present invention.

FIG. 6 shows, in terms of drain efficiency, the amplification efficiency that is improved by connecting the signal power dynamic range compressing circuit of the present invention to the input side of the power amplifier 8. For example, in the case of an input signal with a 10-dB PAPR, a 4-dB suppression of the peak power will provide a 6-dB PAPR reduction of the input combined signal $S_C$ to the power amplifier 8. This permits reduction of a 10-dB output back-off down to 6 dB prior to the suppression of the peak power. The 4-dB suppression of the peak power has such an influence on the amplification efficiency of the power amplifier 8 as described below. Assuming that the amplifier 8 is a class "A" amplifier whose maximum drain efficiency at the saturation output point is 50% and whose output back-off is defined to be the difference between a 1-dB gain compression point and the operating point, the drain efficiency can be improved to about 10% by the application of the present invention, whereas the drain efficiency is 4% or so when the present invention is not used. Thus, even if the peak power is not completely suppressed, the present invention is effective in improving the amplification efficiency of the power amplifier 8. And this does not ever generate either out-of-band leakage of power or intersymbol interference.

SECOND EMBODIMENT

Figure 7:
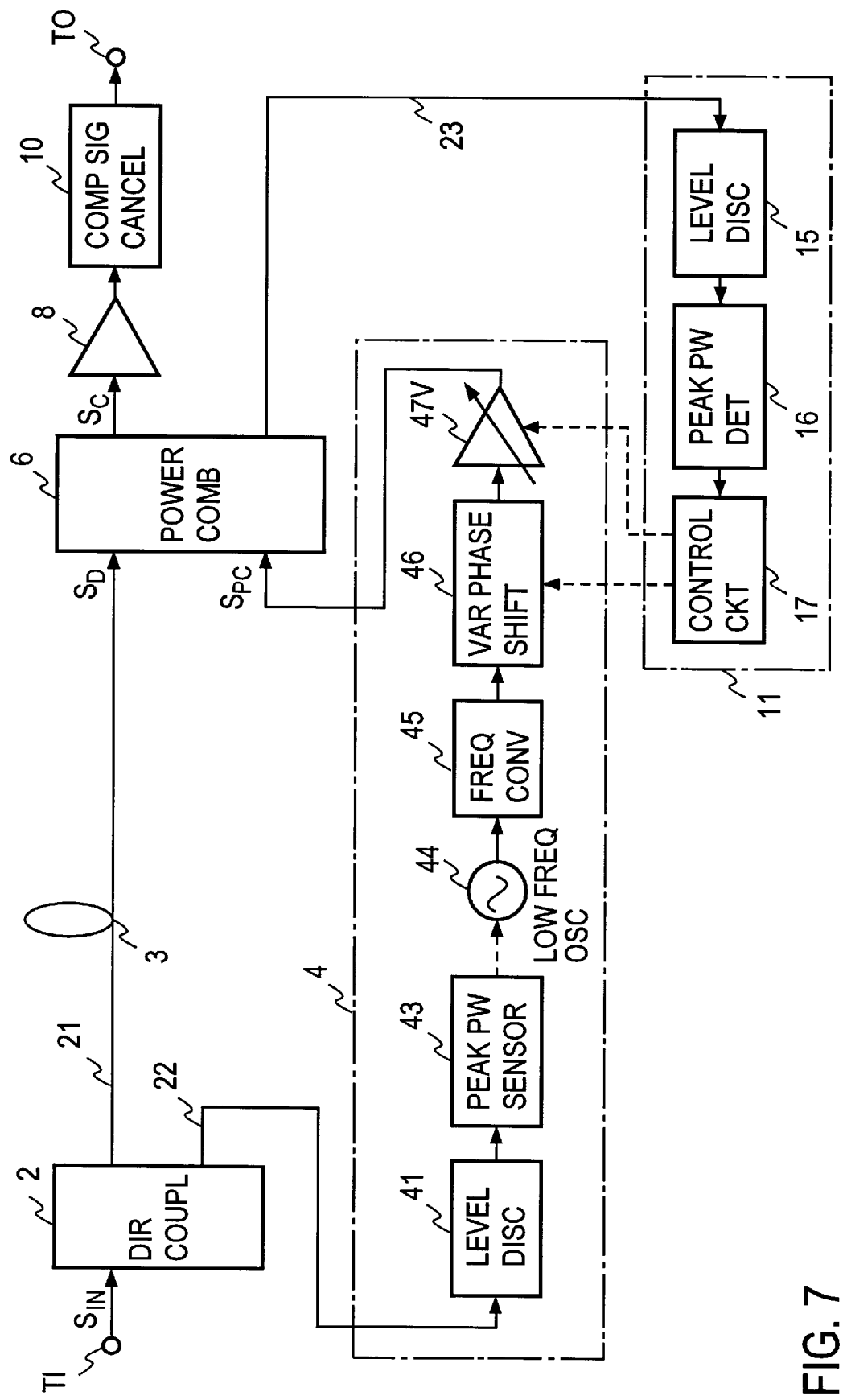
FIG. 7 is a block diagram illustrating a second embodiment of the present invention.

FIG. 7 illustrates in block form a second embodiment of the present invention, in which the peak power detector 42 of the compressing signal generator 4 in FIG. 5 is formed by a peak power detector 43 which measures the peak power of the input signal $S_{IN}$, such as a diode sensor or thermocouple. The peak power detector 43 detects only the peak power of the input signal $S_{IN}$ and does not detect its phase value. Accordingly, the low-frequency oscillator 44 oscillates in a suitable initial phase. The output from the power combiner 6 is provided via the level discriminator 15 and the peak power detector 16 to the control circuit 17, which controls the phase value of the variable phase shifter 46 and the amplitude value of the variable amplifier 47 on a stepwise basis until the minimum peak power is detected. The arrangement of this embodiment permits simplification of the configuration of the peak power detector.

THIRD EMBODIMENT

Figure 8:
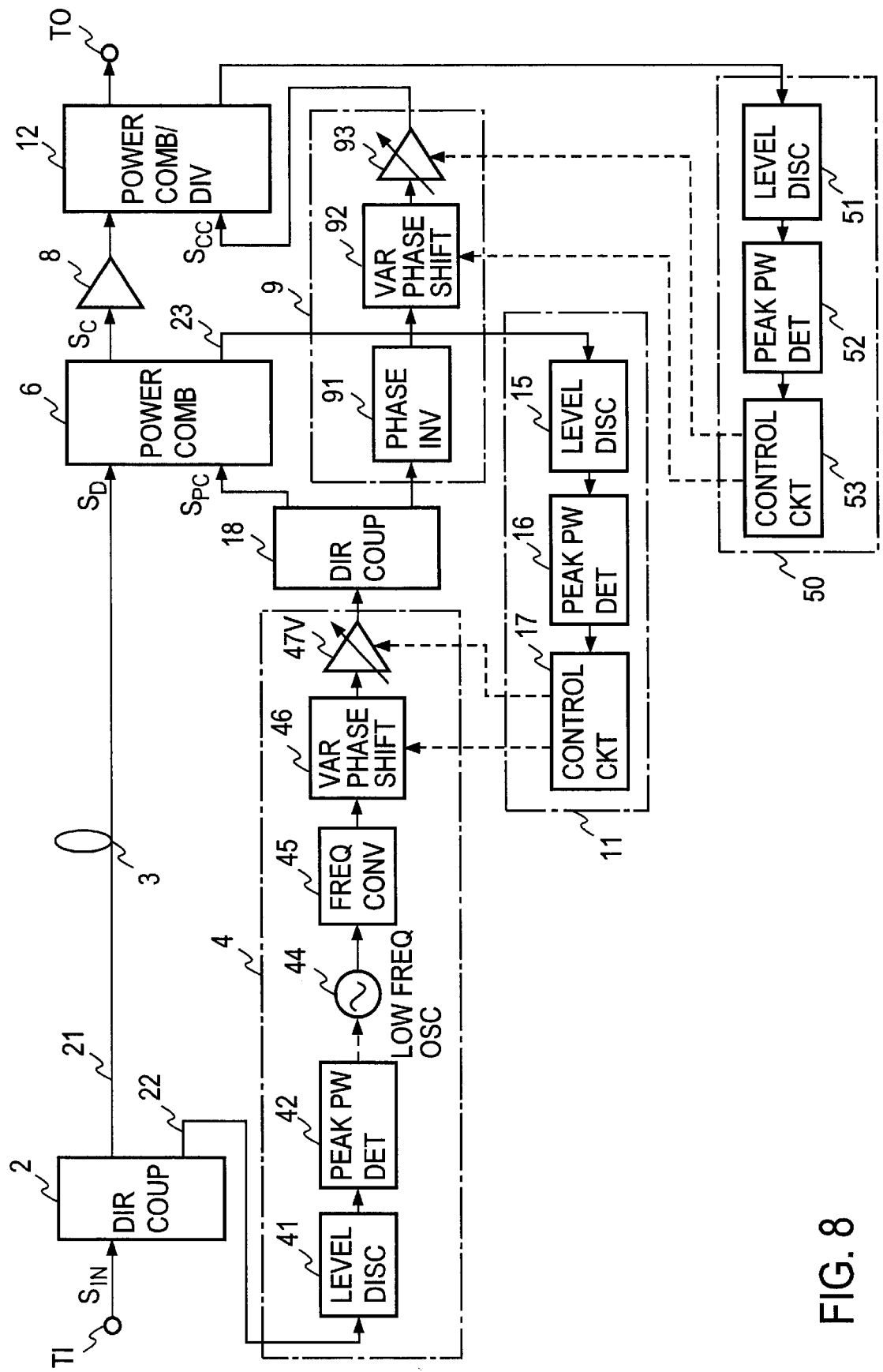
FIG. 8 is a block diagram illustrating a third embodiment of the present invention.

FIG. 8 illustrates in block form a third embodiment of the present invention. While the embodiments of FIGS. 5 and 7 have been described to use a band-pass filter as the compressing signal canceller 10 for canceling the compressing signal in the output from the power amplifier 8, the FIG. 8 embodiment does not employ the band-pass filter but has a construction in which a elimination signal $S_{CC}$ is generated by reversing the phase of the compressing signal $S_{PC}$ and is injected into the output from the power amplifier 8 to cancel the compressing signal component. A combined signal generator 9, which constitutes a path for canceling the compressing signal component, is formed by a cascade connection of a phase inverter 91, a variable phase shifter 92 and a variable amplifier 93. The phase inverter 91 inverts the phase of the compressing signal $S_{PC}$ is divided by the directional coupler 18, and outputs the phase-inverted signal as the elimination signal $S_{CC}$.

The variable phase shifter 92 and the variable amplifier 93 are controlled by a control circuit 53 on a stepwise basis to adjust the phase and amplitude of the elimination signal $S_{CC}$. The output from the power amplifier 8 and the elimination signal $S_{CC}$ are combined/distributed by a power combiner/distributor 10, and the combined output power is mostly provided to an output terminal TO and partly to a combined signal adjustment part 50 for monitor use. The elimination signal adjustment part 50 is formed by a cascade connection of a level discriminator 51, a peak power detector 52 and the control circuit 53. The elimination signal adjustment part 50 operates in the same manner as does the compressing signal adjustment part 11, and adjusts the phase and amplitude of the elimination signal $S_{CC}$ to control the variable phase shifter 92 and the variable amplifier 93 on a step-by-step basis until the level of the residual compressing signal component in the output from the power amplifier 8 goes down below a predetermined field intensity. The variable amplifier 93 for adjusting the amplitude component may be replaced with a variable attenuator.

This embodiment is suitable for use in the case where the injected carrier cannot be cancelled by the band-pass filter 10 as in the first embodiment when frequencies of the input signal $S_{IN}$ and the carrier (compressing signal) injected to suppress its peak power are so close to each other that the frequency bands of the input signal $S_{IN}$ and the compressing signal overlap or completely coincide with each other. This embodiment is particularly effective when the carrier for compressing the peak power is injected into a multi-carrier signal or CDMA carrier.

FOURTH EMBODIMENT

Figure 9:
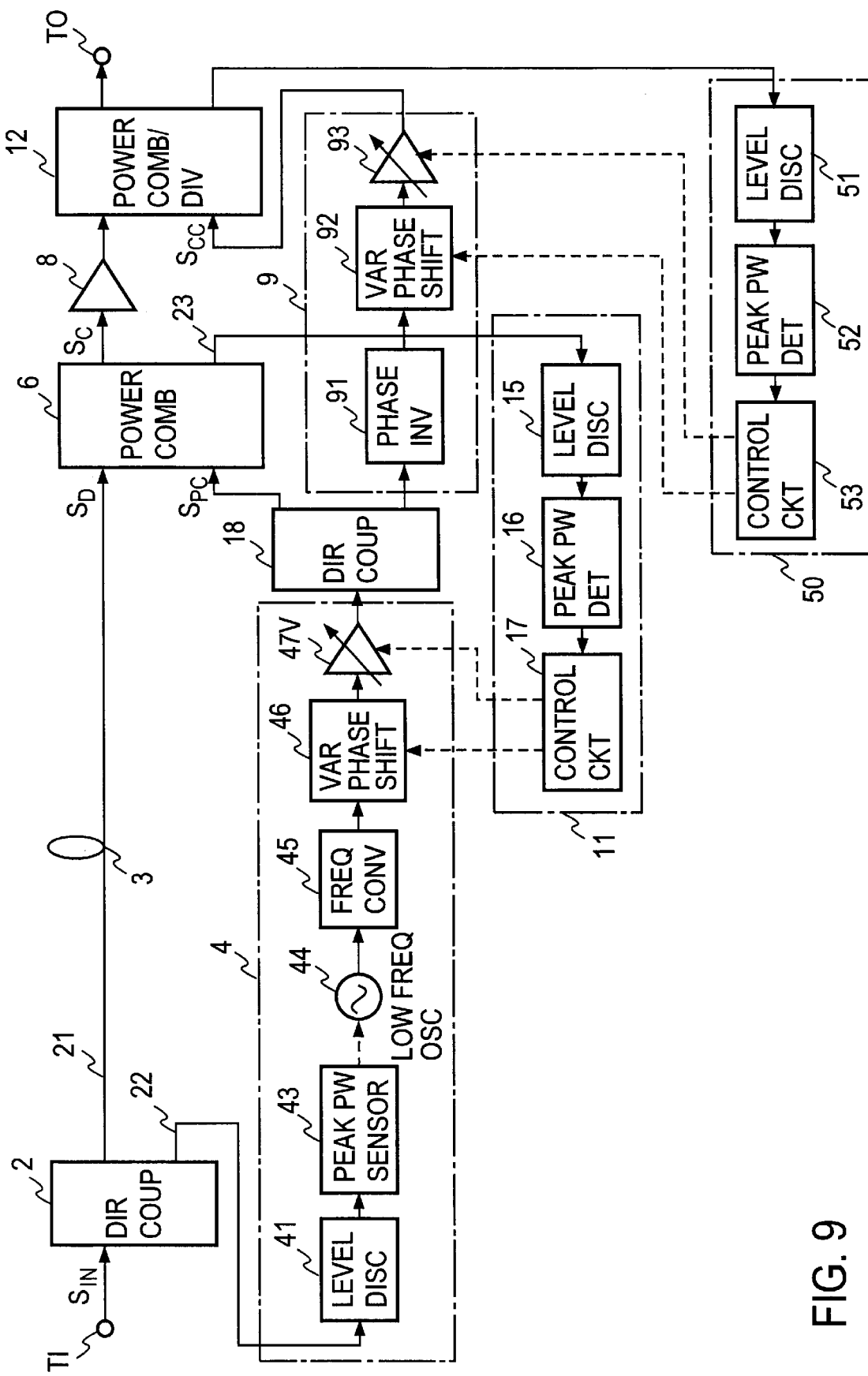
FIG. 9 is a block diagram illustrating a fourth embodiment of the present invention.

FIG. 9 illustrates in block form a fourth embodiment of the present invention, in which the arrangement for canceling the compressing signal component in the FIG. 8 embodiment is applied to the FIG. 7 embodiment. Accordingly, this embodiment uses a diode sensor or thermocouple as the peak power detector as is the case with the second embodiment of FIG. 7. This arrangement permits simplification of the configuration of the peak power detector. The control circuit 17 controls the phase value of the variable phase shifter 46 and the amplitude value of the variable amplifier 47 V on a stepwise basis until the minimum peak power is detected. The variable amplifier 47 V may be replaced with a variable attenuator. The combined signal generator 9 is the same as that used in the third embodiment. Thus, the peak power detector and the low-frequency oscillator can be made simple-structured.

FIFTH EMBODIMENT

Figure 10:
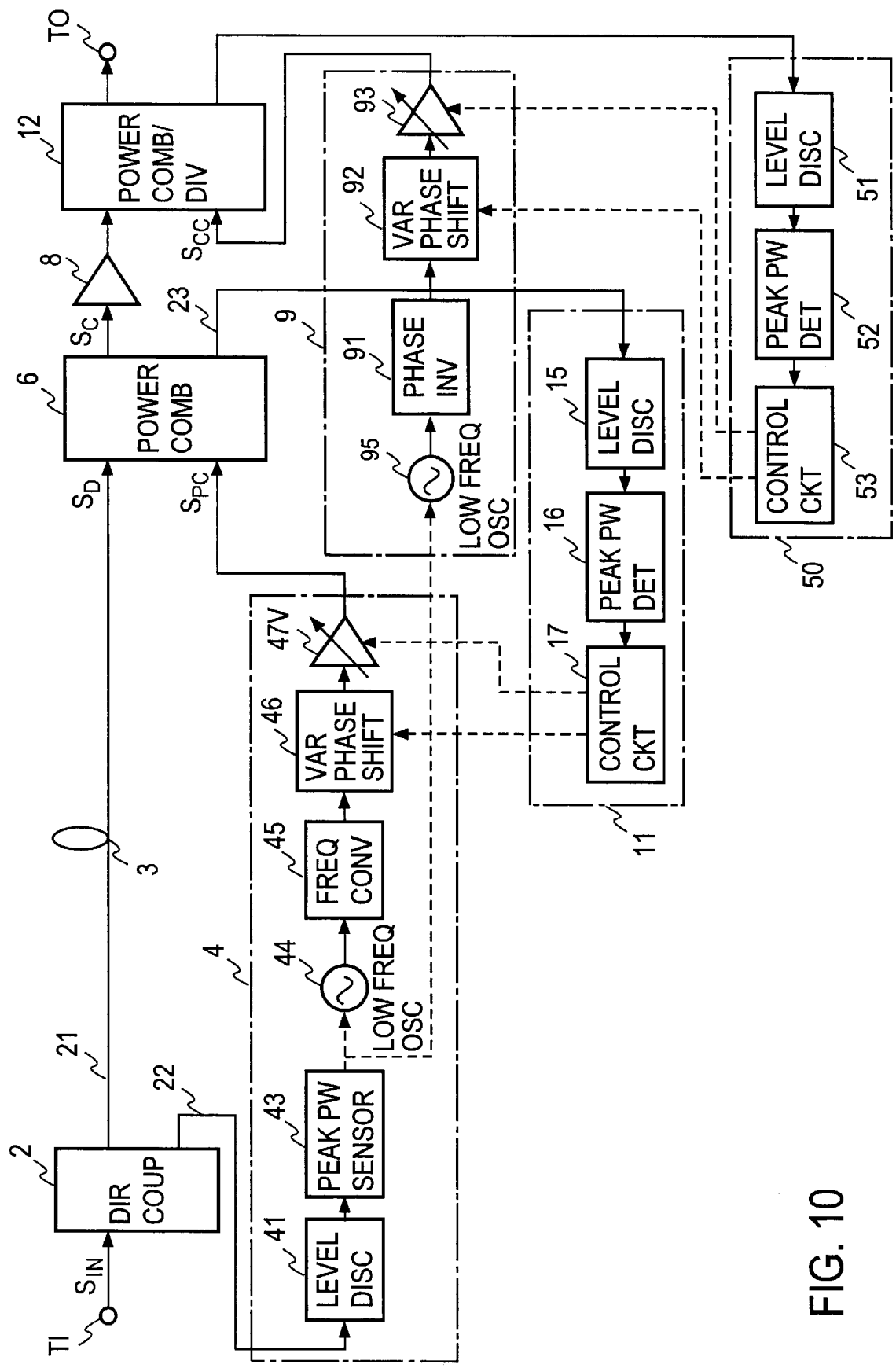
FIG. 10 is a block diagram illustrating a fifth embodiment of the present invention.

FIG. 10 illustrates in block form a fifth embodiment of the present invention. While the FIG. 9 embodiment has been described to use the compressing signal $S_{PC}$ as the elimination signal $S_{CC}$ that is applied to the power combiner/divider 12 serving as the compressing signal canceller, the FIG. 10 embodiment generates the elimination signal $S_{CC}$ from the output from the peak power detector 43. That is, in this embodiment, based on the phase and amplitude of the input signal detected by the peak detector 43 in the compressing signal generating path 22, the vector for canceling the remaining compressing component is generated by a low-frequency oscillator 95, a frequency converter 96, the variable phase shifter 92 and the variable amplifier. This method facilitates the generation of the signal for canceling the compressing signal. Further, since the combined signal generating path is similar in configuration to the compressing signal generating path, common modules can be used for respective parts in the device configuration.

SIXTH EMBODIMENT

Figure 11:
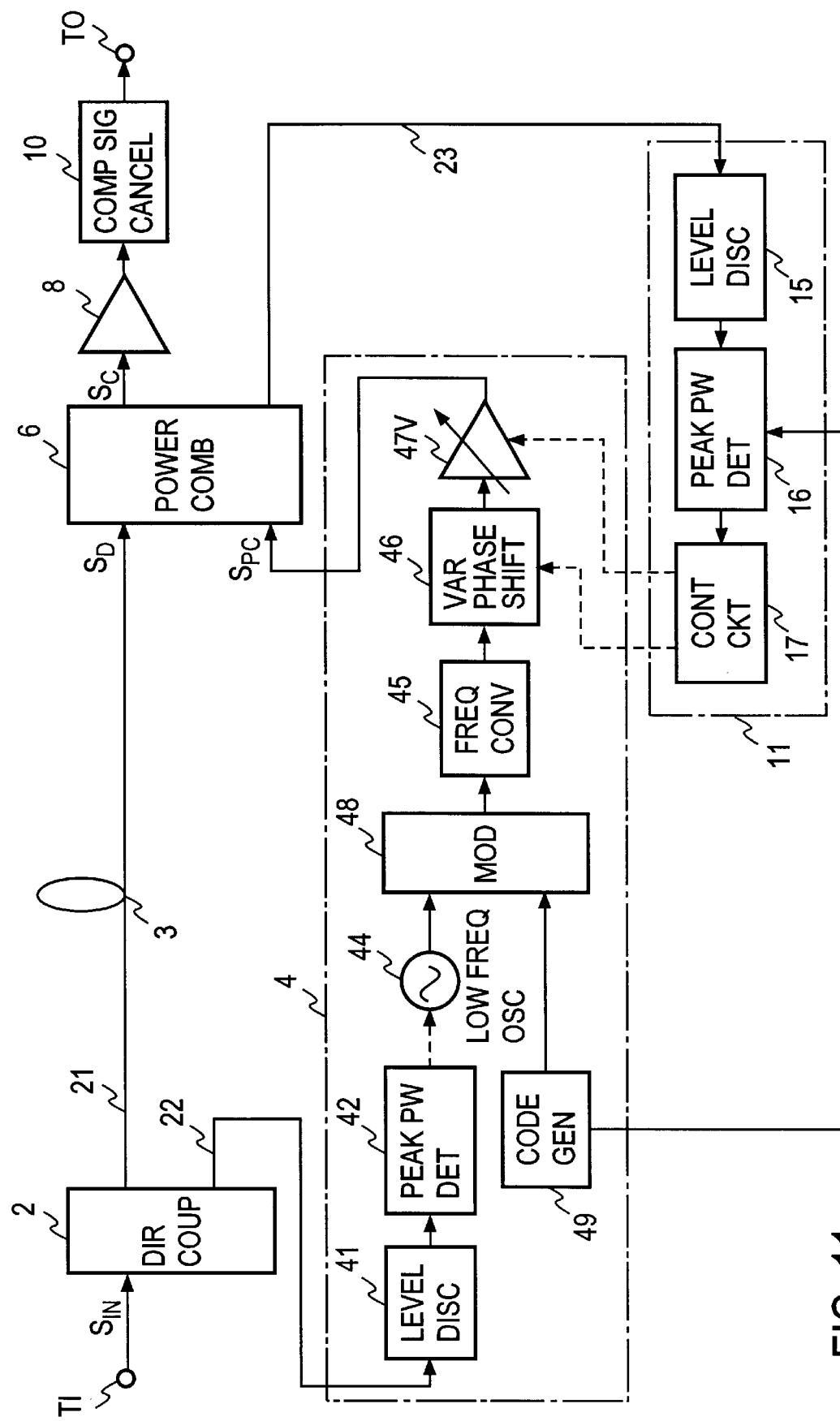
FIG. 11 is a block diagram illustrating a sixth embodiment of the present invention.

FIG. 11 illustrates in block form a sixth embodiment of the present invention, in which the signal generated by the low-frequency oscillator 44 in the FIG. 5 embodiment is modulated using a specific code. This scheme allows ease in detecting the peak power of the combined signal $S_C$ that is applied to the power amplifier 8. The compressing signal vector by the low-frequency oscillator 44 is prone to undergo amplitude and phase variations under the influence of noise or the like. With a view to increasing the stability of the compressing signal, this embodiment generates a specific code like a PN sequence by a code generator 49 and uses it to modulate the tone signal generated by the low-frequency oscillator 44. The thus modulated signal is provided via the frequency converter 45, the variable phase shifter 46 and the variable amplifier 47 to the power combiner 6, by which it is combined with the output from the linear signal transfer path 21, and the combined output is input to the power amplifier 8. Since this embodiment uses the code-modulated signal as the compressing signal, the frequency converter 45 needs to be set so that the band of the code-modulated signal lies outside the band of the input signal $S_{IN}$.

In the path 23 (composed of the power combiner 6, the level discriminator 15, the peak power detector 16 and the control circuit 17) for monitoring the peak power of the combined signal, the level discriminator 15 observes the peak power and the peak power detector 16 detects controlled variables of the variable phase shifter 46 and the variable amplifier 47 V. At this time, the peak power detector 16 demodulates the input signal by the same code as that generated by the code generator 49. This provides increased stability for the compressing signal. The structure that uses, as the compressing signal, the signal modulated by the code generated by the code generator 49 as described above can be applied as well to the FIG. 7 embodiment. It is also applicable to the embodiments of FIGS. 8, 9 and 10, in which case the frequency band of the compressing signal may overlap or completely coincide with the frequency band of the input signal.

Figure 12:
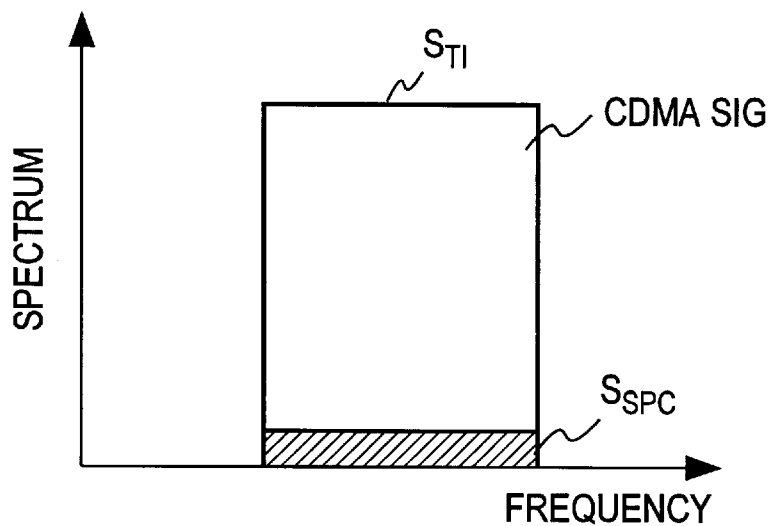
FIG. 12 is a graph showing the spectrum of the input to the amplifier when a CDMA signal is injected, as a compressing signal, into the same band as that of the input.
Figure 13:
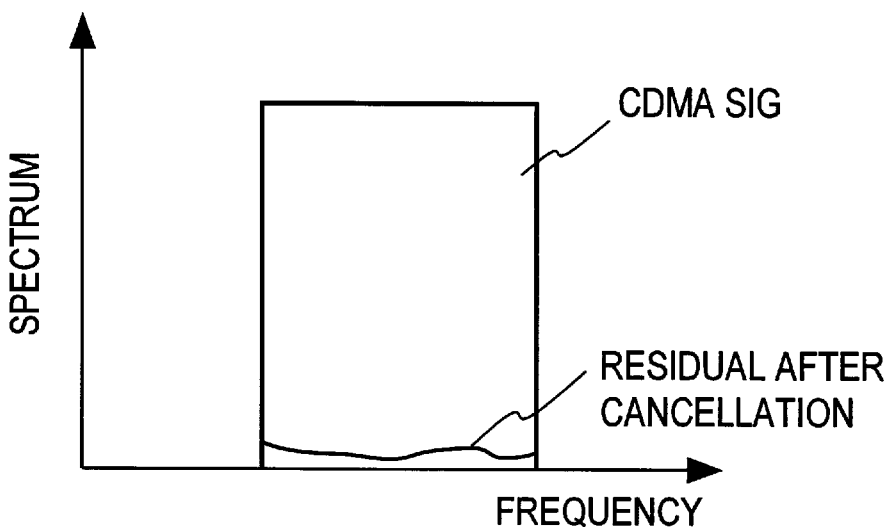
FIG. 13 is a graph showing the spectrum of the output from the amplifier when the CDMA signal is injected into the same band as that of the input.

In the FIG. 11 embodiment of the arrangement that uses the code-modulated compressing signal $S_{PC}$ and in the cases where the arrangement is applied to the embodiments of FIGS. 8, 9 and 10, the compressing signal component in the output from the power amplifier 8 can be cancelled by the elimination signal $S_{CC}$ even if the compressing signal $S_{PC}$ is frequency converted and then combined with the output signal $S_D$ from the linear signal transfer path 21 in the frequency band overlapping with that of the input signal $S_{IN}$. For example, when the input signal is a CDMA signal whose frequency band is indicated by $S_{TI}$ in FIG. 12, the modulation is performed using a code (a spread spectrum code) that has the same frequency band $S_{SPC}$ as that $S_{TI}$. As a result, the compressing signal component in the output from the power amplifier 8 is cancelled in the band-pass filter 10. In practice, the compressing signal component is not completely cancelled but remains in the CDMA signal band as a residual as shown in FIG. 13; however, it can be reduced negligibly small.

Figure 14:
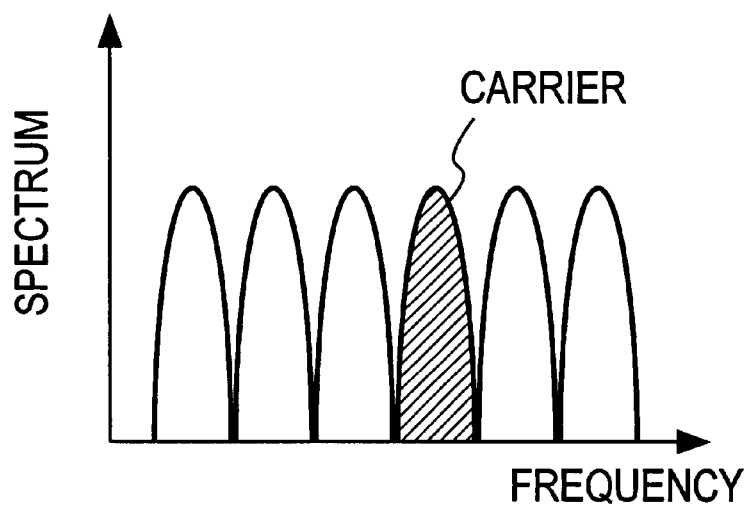
FIG. 14 is a graph showing the spectrum of the input to the amplifier when a carrier signal is injected, as a compressing signal, into the same band as that of the input signal.
Figure 15:
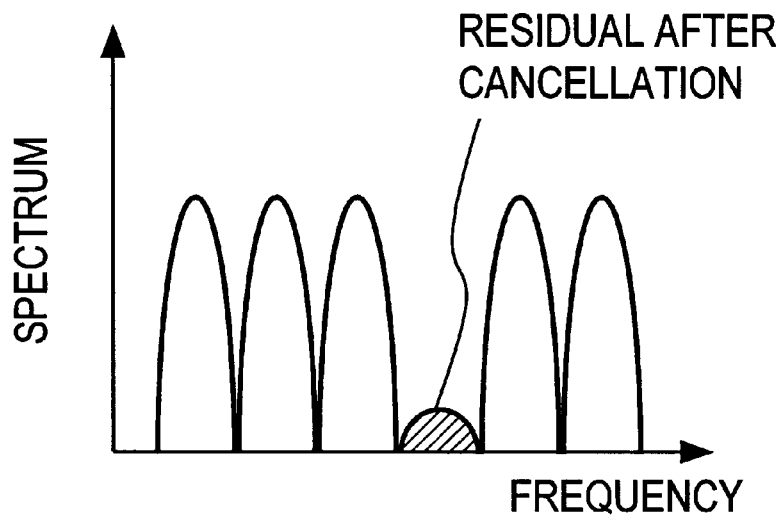
FIG. 15 is a graph showing the spectrum of the output from the amplifier when the carrier signal is injected into the same band as that of the input signal.

Similarly, in the case where the input signal $S_{IN}$ is, for example, a multi-carrier signal in the embodiments of FIGS. 8, 9, and 10, and a carrier signal as the compressing signal $S_{PC}$ is injected in the same frequency band as that of the input signal $S_{IN}$ (that is, combined by the power combiner 6 with the output signal from the linear signal transfer path 21), as depicted in FIG. 14, a canceling carrier signal opposite in phase to the compressing carrier signal is combined by the power combiner/divider 12 with the output from the power amplifier 8, by which the remaining compressing carrier signal can cancelled down to a low level as depicted in FIG. 15.

Figure 16:
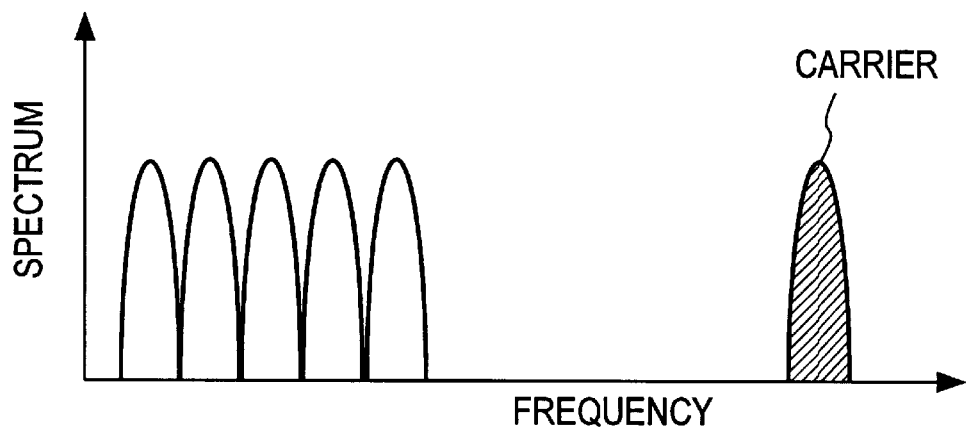
FIG. 16 is a graph showing the spectrum of the input to the amplifier when the carrier signal is injected, as a compressing signal, into a band different from that of the input signal.
Figure 17:
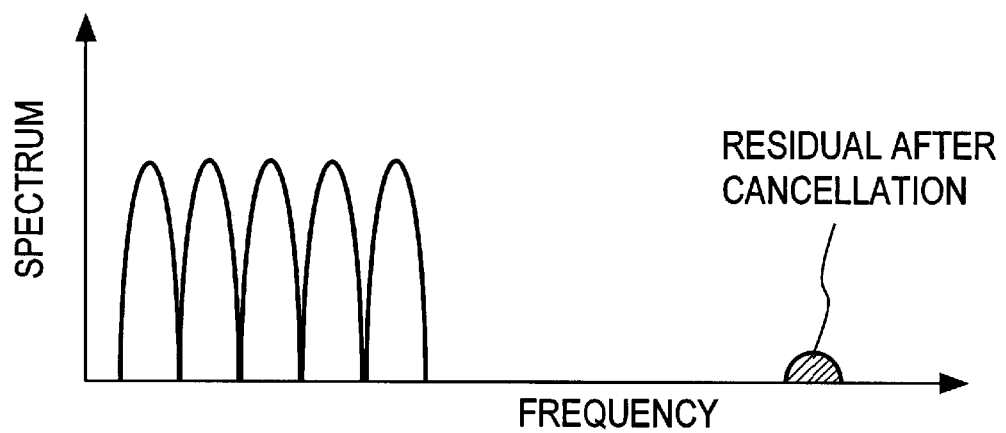
FIG. 17 is a graph showing the spectrum of the output from the amplifier when the carrier signal is injected into a band different from that of the input signal.

In the case where the compressing carrier signal is injected outside of the frequency band of the input multi-carrier signal as depicted in FIG. 16, too, the compressing signal component (i.e., the compressing carrier component) in the output from the power amplifier 8 can be cancelled to a sufficiently low level, as shown in FIG. 17, by injecting a cancel carrier signal opposite in phase to the compressing carrier signal in the power combiner/divider 12.

SEVENTH EMBODIMENT

Figure 18:
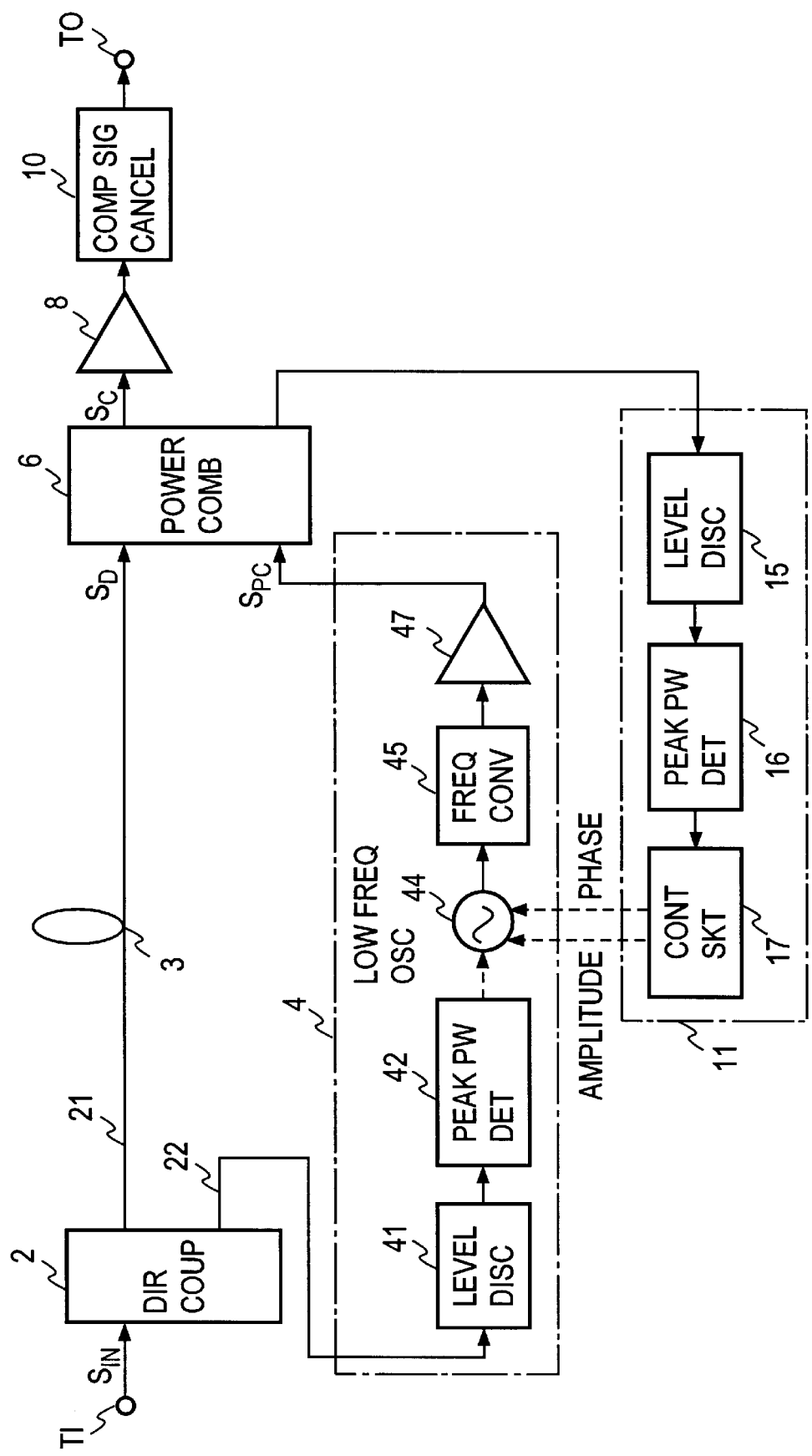
FIG. 18 is a block diagram illustrating a seventh embodiment of the present invention.

FIG. 18 illustrates a seventh embodiment of the present invention. In the above-described embodiments of FIGS. 5 and 7 to 11, the output distributed from the power combiner 6 is monitored and the variable phase shifter 46 and the variable amplifier 47 V are controlled so that the peak power does not exceed the threshold value, but instead the low-frequency oscillator 44 may be controlled based on the monitored output. Shown in FIG. 18 is an application of such control to the FIG. 5 embodiment. The compressing signal generator 4 is made up of the level discriminator 41, the peak power detector 42, the low-frequency oscillator 44, the frequency converter 45 and an amplifier 47. The compressing signal $S_{PC}$ is generated by the compressing signal generator 4 from a signal from the directional coupler 2 having monitored the input signal to the power amplifier 8. The compressing signal $S_{PC}$ is combined by the power combiner 6 with the output from the linear signal transfer path 21 to reduce the peak power of the input signal to the power amplifier 8.

The level discriminator 41 observes the amplitude of the input signal to the power amplifier 8. The instantaneous value of the amplitude thus observed is compared with a threshold value preset in the level discriminator 41, and if the instantaneous value is larger than the threshold value, the input signal $S_{IN}$ is provided to the peak power detector 42.

The peak power detector 42 performs orthogonal detection of the input signal $S_{IN}$ fed from the level discriminator 41 to detect the vector (amplitude and phase values) of the input signal. The thus detected amplitude and phase values are set in the low-frequency oscillator 44.

The low-frequency oscillator 44 is formed by a synthesizer in which the amplitude and phase values can be set. In this instance, the phase value is set nearly 180° out of phase with the input signal so as to suppress the amplifier input. The low-frequency oscillator 44 generates a tone signal that has the preset amplitude and phase values. This provides a vector that suppresses the peak power.

The output from the low-frequency oscillator 44 is frequency-converted by the frequency converter 45 to a predetermined band. The oscillator output may be frequency-converted to a band identical with or different from that of the amplifier input signal $S_{PC}$. The thus frequency-converted compressing signal $S_{PC}$ is provided via the amplifier for level adjustment use to the power combiner 6, wherein it is combined with the output signal from the delay line 3. The combined output is mostly applied to the power amplifier 8 but partly to the control path 23.

In the control path 23 the level discriminator 15 discriminates an instantaneous value of the amplitude of the distributed signal and, when the instantaneous amplitude value is larger than a preset threshold value, the peak power detector 16 performs orthogonal detection of the signal. The control circuit 17 uses the orthogonally-detected signal to control the amplitude and phase values of the tone signal, which is generated by the low-frequency oscillator 44, by an adaptive algorithm on a stepwise basis in a manner to reduce the peak power of the amplifier input signal $S_C$. The control circuit 17 is formed by a microprocessor, and uses a perturbation algorithm, least square estimation algorithm, or the like as the adaptive algorithm.

Such control of the low-frequency oscillator 44 as described above is equivalent to suppressing the peak value of the amplifier input signal at the time of receiving it in the base band. The control operation in the base band allows control in the operating band broader than the modulation signal bandwidth. This permits simplification of the control circuit configuration. A modulating wave may be used as the compressing signal, in which case the configuration of this embodiment need not be modified and the same results as mentioned above are obtainable as well.

In the embodiments described above with reference to FIGS. 5, 7 to 11 and 18, a signal opposite in phase to the input signal $S_{IN}$ at the time of detecting its peak power is generated as the compressing signal $S_{PC}$ and is combined with the input signal $S_{IN}$ (properly speaking, the output signal $S_D$ from the linear signal transfer path 21). That is, the compressing signal vector may be determined so that the combined vector always has a constant amplitude value smaller than a predetermined value, but the compressing signal needs to have a component 180° out of phase with at least the input signal vector.

While the embodiments of FIGS. 5, 7 to 11 and 18 have been described to detect and reduce the peak power of the input signal to thereby compress the dynamic range of the input signal power, the following embodiments will be described to compress the dynamic range of the input signal power by reducing the PAPR of the input signal.

EIGHTH EMBODIMENT

Figure 19:
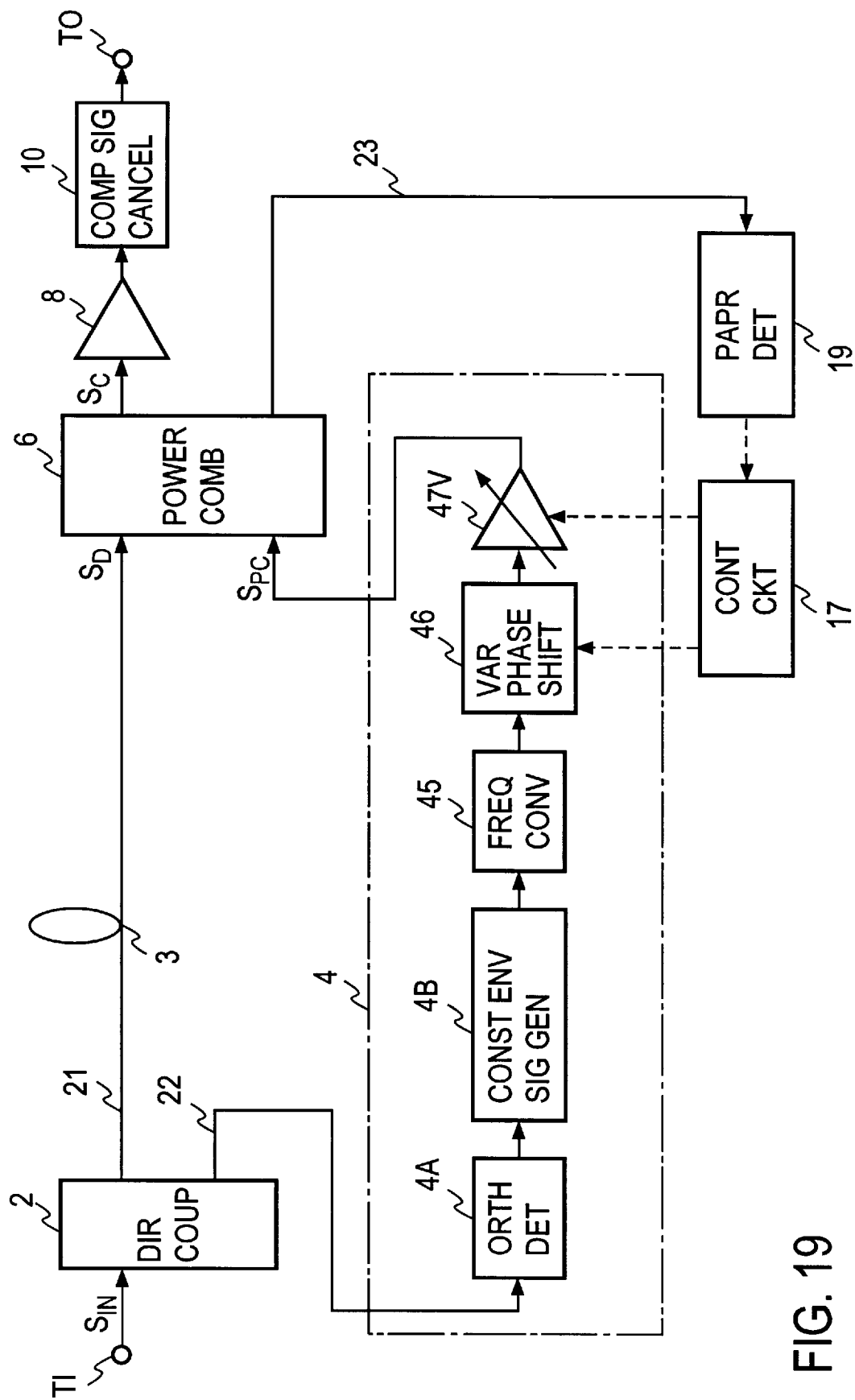
FIG. 19 is a block diagram illustrating an eighth embodiment of the present invention.

FIG. 19 illustrates in block form an eighth embodiment of the present invention, in which the amplifier input signal $S_{IN}$ is distributed by the directional coupler 2 to the linear signal transfer path 21 formed by the delay line 3 and the compressing signal generating path 22 formed by the compressing signal generator 4. The compressing signal generator 4 is formed by a cascade connection of an orthogonal detector 4A, a constant-envelope signal generator 4B, the frequency converter 45, the variable phase shifter 46 and the variable amplifier 47. The orthogonal detector 4A performs orthogonal detection of the input signal to observe its vector (phase and amplitude). The vector thus observed is provided to the constant-envelope signal generator 4B, which reverse the phase of the input signal. As for the amplitude of the input signal, the constant-envelope composing signal generator 4B estimates the combined signal $S_C$ through numerical calculations and sets the amplitude at such a value that the combined signal $S_C$ will have a constant envelope. By this, it is possible to generate a vector that suppresses the PAPR of the input signal.

The output from the constant-envelope signal generator 4B is frequency-converted by the frequency converter 45 to a predetermined band. In this instance, the output may be frequency-converted to a band identical with or different from that of the amplifier input signal. The frequency-converted compressing signal $S_{PC}$ is subjected to final adjustments of its amplitude and phase by the variable phase shifter 46 and the variable amplifier 47, thereafter being injected by the power combiner 6 into the amplifier input signal. The variable amplifier 47 V may be replaced with a variable attenuator. In the control path 23, the PAPR detector 19 detects the ratio between the peak voltage and average voltage or between the peak power and average power of the signal divided from the power combiner 6, and when the detected ratio is above a preset threshold value, the PAPR detector 19 performs orthogonal detection of the input signal, and the control circuit 17 controls the variable phase shifter 46 and the variable amplifier 47 V by an adaptive algorithm on a stepwise basis. That is, the signals $S_D$ and $S_{PC}$ will be 180° out-of-phase on the IQ plane after orthogonal detection of the signal $S_C$ combined by the power combiner 6, but the vector of this combined signal $S_C$ does not always have a constant-envelope vector. To avoid this, the control circuit 17 monitors the amplitude of the combined signal $S_C$ through the PAPR detector 19, and controls the variable phase shifter 46 and the variable amplifier 47 V to adjust the phase and amplitude of the compressing signal $S_{PC}$ so that the combined signal $S_C$ will have a predetermined amplitude. In other words, the variable amplifier 47 V and the variable phase shifter 46 control the amplitude and phase of the constant-envelope composing signal $S_{PC}$ on a stepwise basis so that the combined signal $S_C$ will have a constant-envelope vector. This control can be provided by various adaptive algorithms such as the steepest descent method and the most likelihood estimation method.

The PAPR detector 19 can be implemented by a diode sensor, for instance. In the case of measuring the peak power, a diode sensor of a small time constant is used. The sensor output is sampled to detect an instantaneous value of the sensor input voltage, and the maximum instantaneous value is set as the peak power value. In the case of measuring the average power, a diode sensor of a large time constant is used; the sensor output is sampled and the average value is set as the average power. A thermocouple may be used in place of the diode sensor. The control circuit 17 is formed by a microcomputer, and controls the variable phase shifter 46 and the variable amplifier 47 V by a perturbation algorithm, least square estimation algorithm, or the like. The variable amplifier 47 V may be replaced with a variable attenuator, in which case, too, it is possible to achieve the same PAPR reduction as described above.

For example, in the case of an input signal with a 10-dB PAPR, a 4-dB suppression of the peak power will provide a 6-dB PAPR reduction of the input combined signal $S_C$ to the power amplifier 8. This permits reduction of a 10-dB output back-off down to 6 dB prior to the suppression of the peak power. The 4-dB suppression of the peak power has such an influence on the amplification efficiency of the power amplifier 8 as described below. Assuming that the amplifier 8 is a class "A" amplifier whose maximum drain efficiency at the saturation output point is 50% and whose output back-off is defined to be the difference between a 1-dB gain compression point and the operating point, the drain efficiency can be improved to about 10% by the application of the present invention, whereas the drain efficiency is 4% or so when the present invention is not used. Thus, even if the peak power is not completely suppressed, the present invention is effective in improving the amplification efficiency of the power amplifier 8. And this does not ever develop either out-of-band leakage of power or intersymbol interference.

NINTH EMBODIMENT

Figure 20:
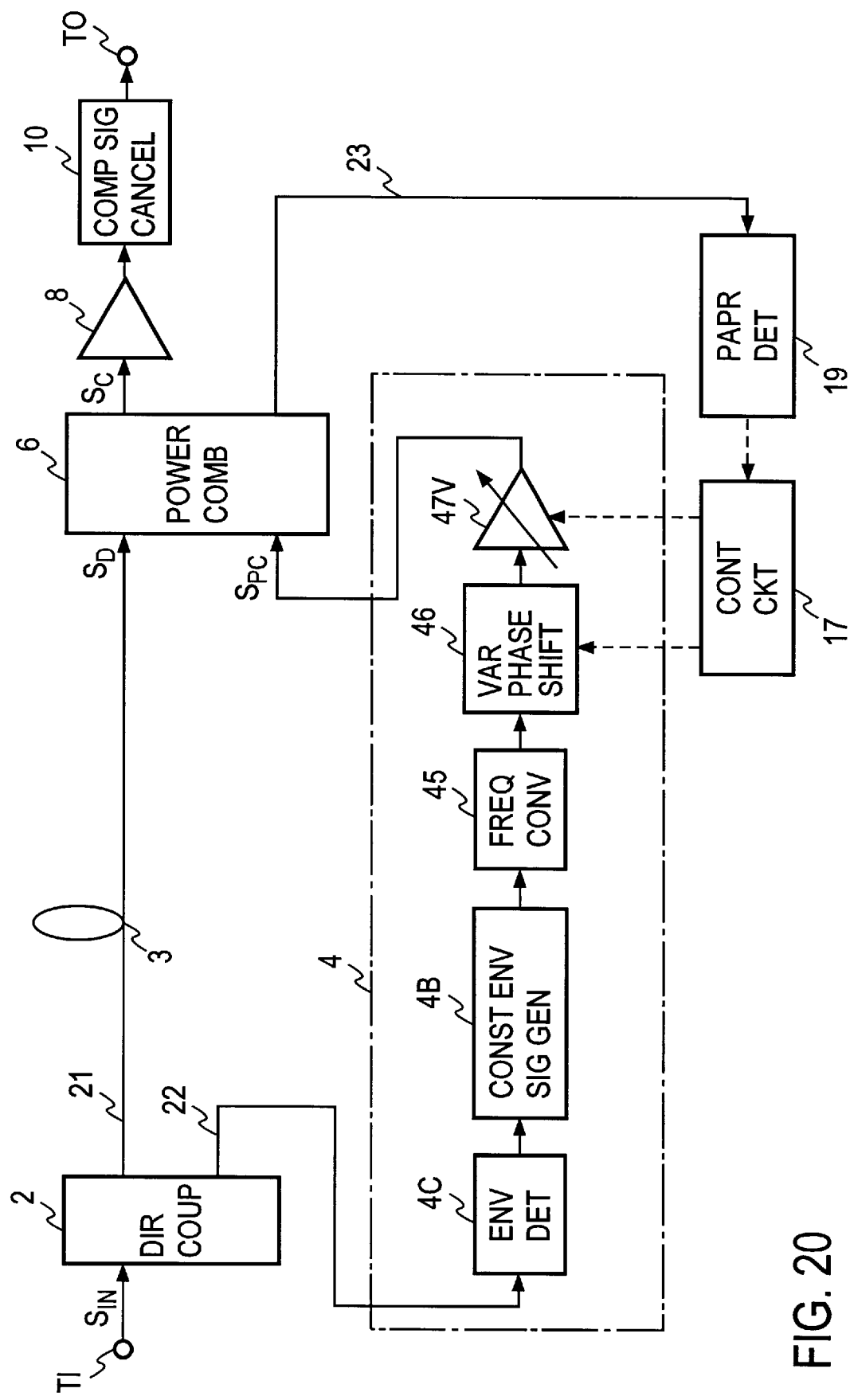
FIG. 20 is a block diagram illustrating a ninth embodiment of the present invention.

FIG. 20 illustrates in block form a ninth embodiment of the present invention, which uses an envelope detector 4C in place of the orthogonal detector 4A in the compressing signal generating path 22 in the FIG. 19 embodiment. This permits simplification of the configuration of the compressing signal generator 4.

TENTH EMBODIMENT

Figure 21:
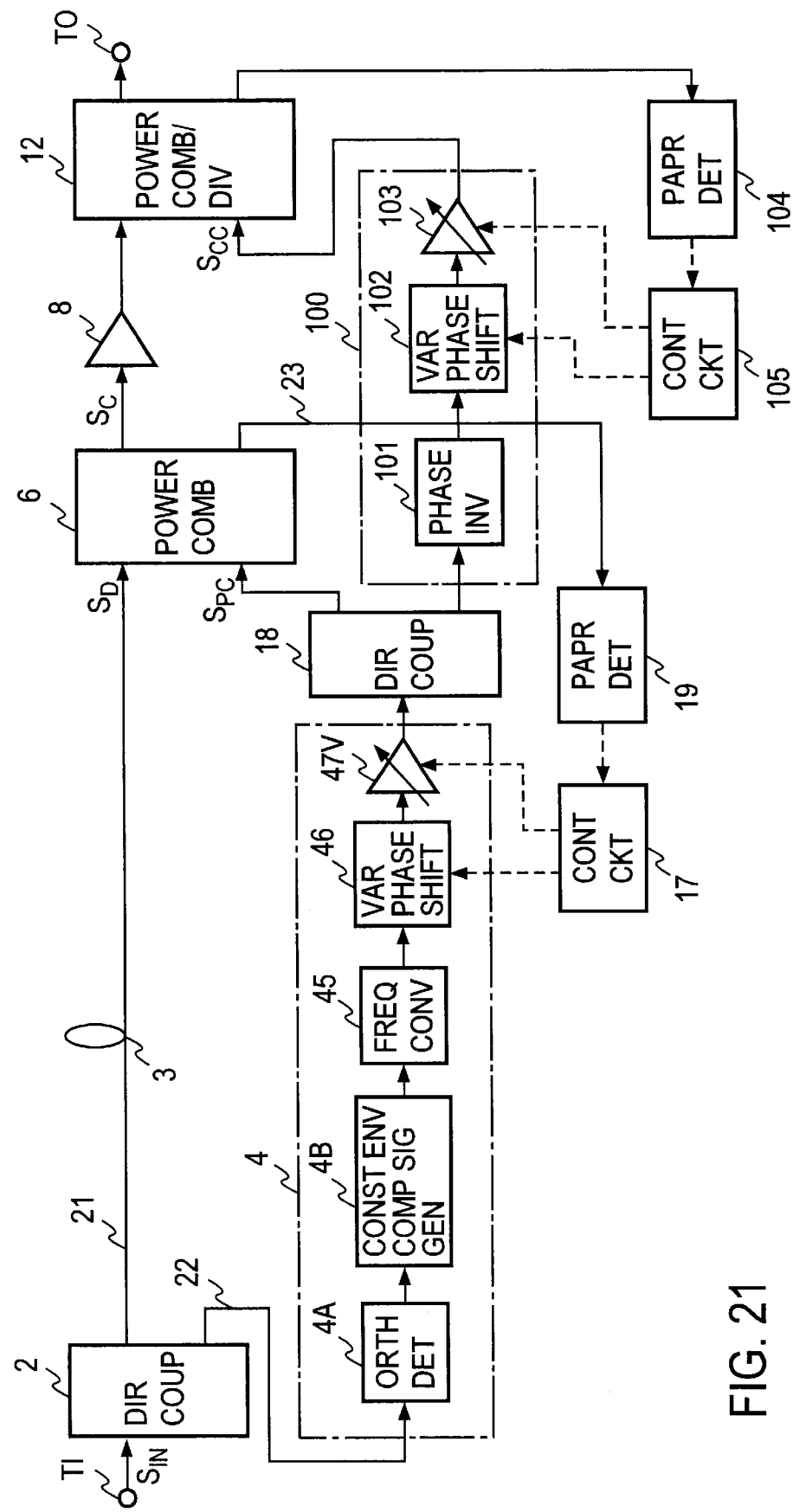
FIG. 21 is a block diagram illustrating a tenth embodiment of the present invention.

FIG. 21 illustrates in block form a tenth embodiment of the present invention. In this embodiment the phase of the compressing signal $S_{PC}$ is reversed to form the elimination signal $S_{CC}$, which is injected into the amplifier output to cancel the PAPR compressing signal at the output side of the amplifier 8. A combined signal generator 100, which constitutes a compressing signal cancellation path, is formed by a cascade connection of a phase invertor signal generator 101, a variable phase shifter 102 and a variable amplifier 103. The variable phase shifter 102 and the variable amplifier 103 are controlled by a control circuit 105 on a step-by-step basis. The control circuit 105 controls the variable phase shifter 102 and the variable amplifier 103 on a stepwise basis until the level of the PAPR compressing signal goes down below a predetermined field intensity.

The variable amplifier 103 may be substituted with a variable attenuator. This embodiment is suitable for use in the case where frequencies of the input signal $S_{IN}$ and the carrier injected for PAPR suppression are so close to each other that the injected carrier cannot be cancelled by a band-pass filter or the like as in the eight embodiment. This embodiment is particularly effective, for example, when the carrier for compressing the peak power is injected into a multi-carrier signal or CDMA carrier.

ELEVENTH EMBODIMENT

Figure 22:
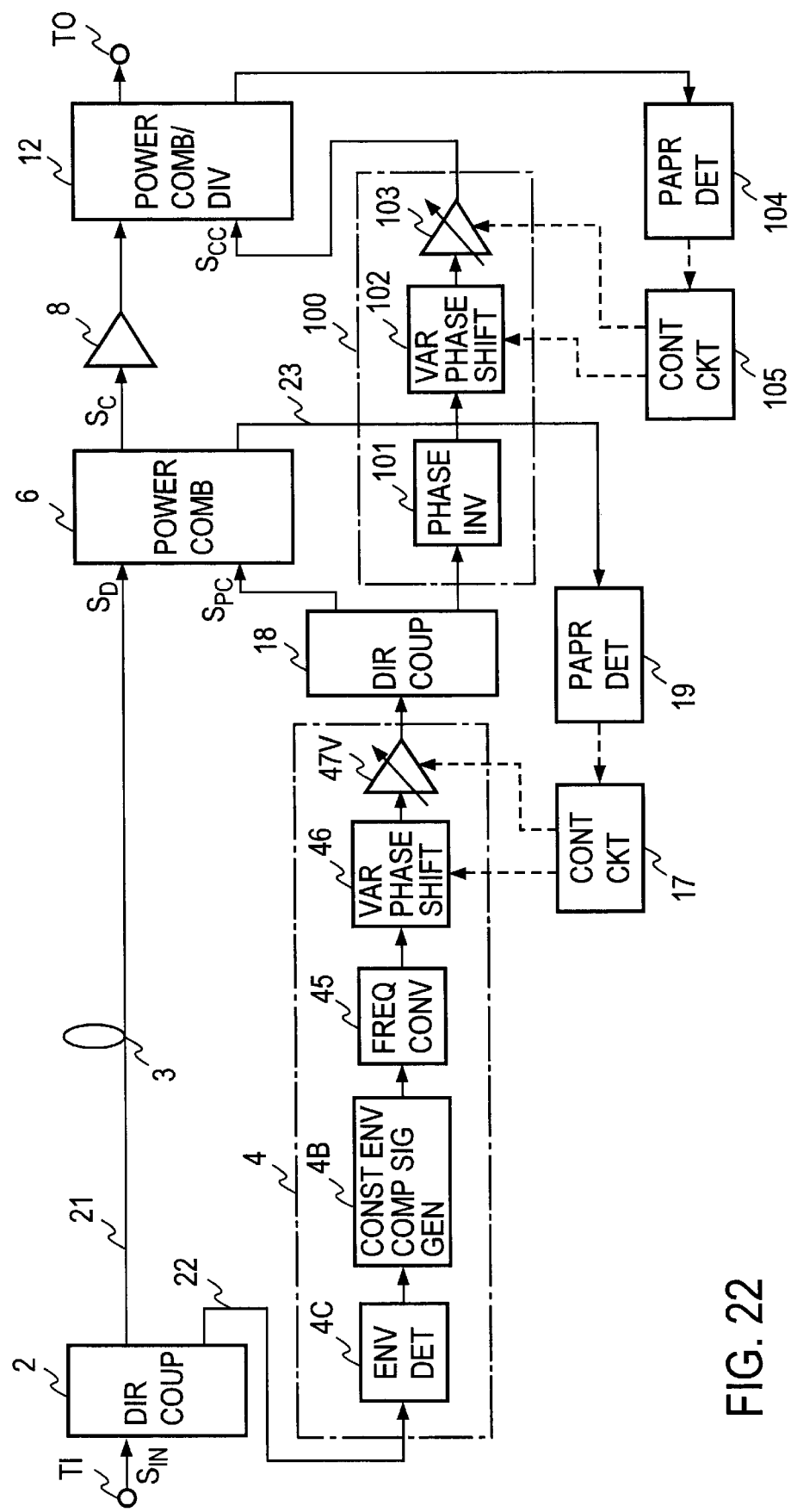
FIG. 22 is a block diagram illustrating an eleventh embodiment of the present invention.

FIG. 22 illustrates in block form an eleventh embodiment of the present invention, which uses the envelope detector 4C in place of the orthogonal detector 4A in the compressing signal generating path 22 as is the case with the ninth embodiment. This also permits simplification of the compressing signal generator 4. The combined signal generator 100 is identical with that used in the tenth embodiment.

TWELFTH EMBODIMENT

Figure 23:
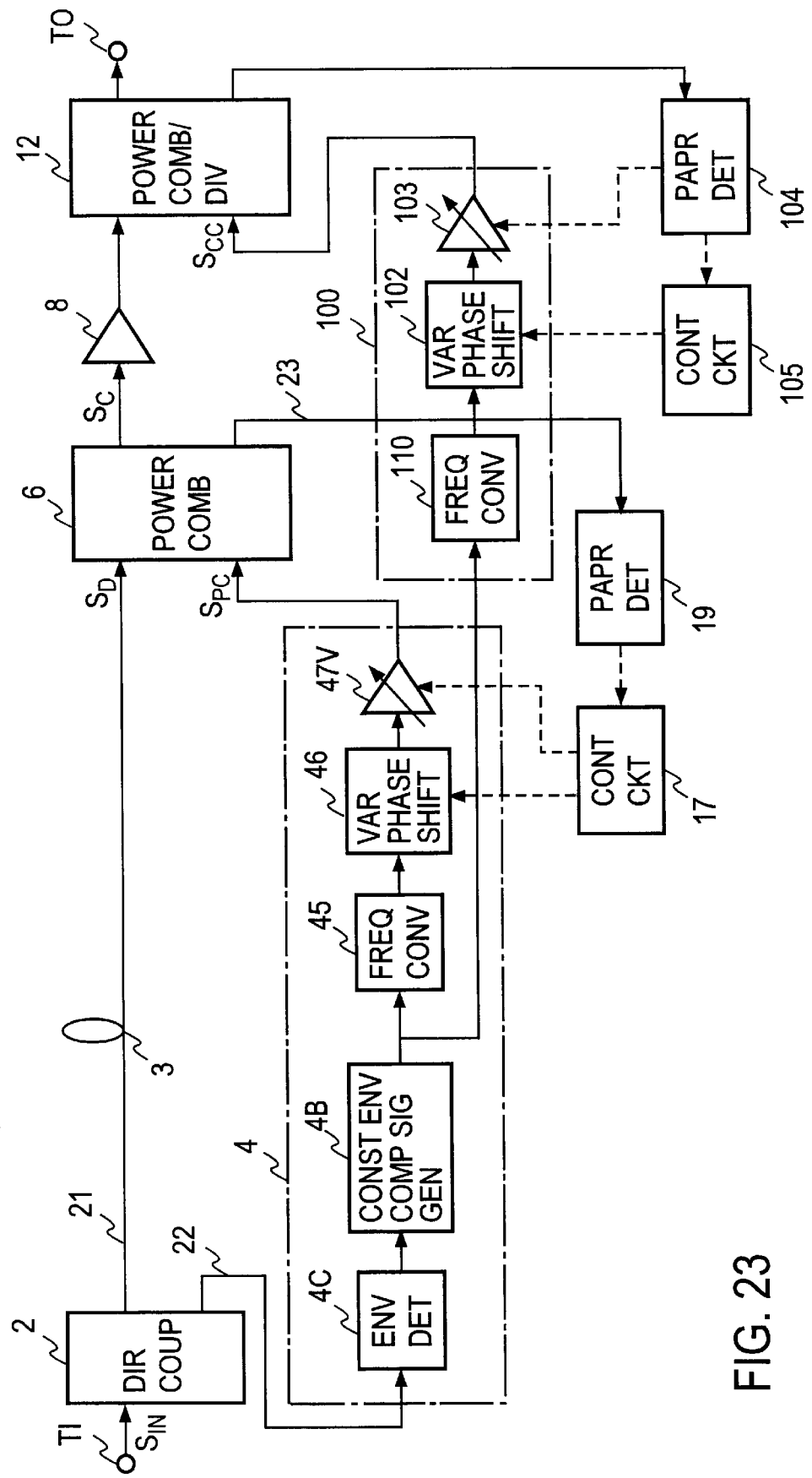
FIG. 23 is a block diagram illustrating a twelfth embodiment of the present invention.

FIG. 23 illustrates in block form a twelfth embodiment of the present invention, which uses the output from the constant-envelope signal generator 4B in the compressing signal generating path 22 to generate the vector for canceling the compressing signal component in the output from the power amplifier 8. This scheme allows ease in the generation of the elimination signal $S_{CC}$ for canceling the compressing signal $S_{PC}$. Further, since the combined signal generating path is similar in configuration to the compressing signal generating path, common modules can be used for respective parts in the device configuration.

The signal power dynamic range compressing circuits in FIGS. 5 and 7 to 11 and in FIGS. 19 to 23 are similar in configuration and in effect. Any of the circuits suppresses the peak power or peak-to-average-power ratio to reduce the output back-off of the power amplifier, enabling it to perform high-efficiency amplification.

THIRTEENTH EMBODIMENT

Figure 24:
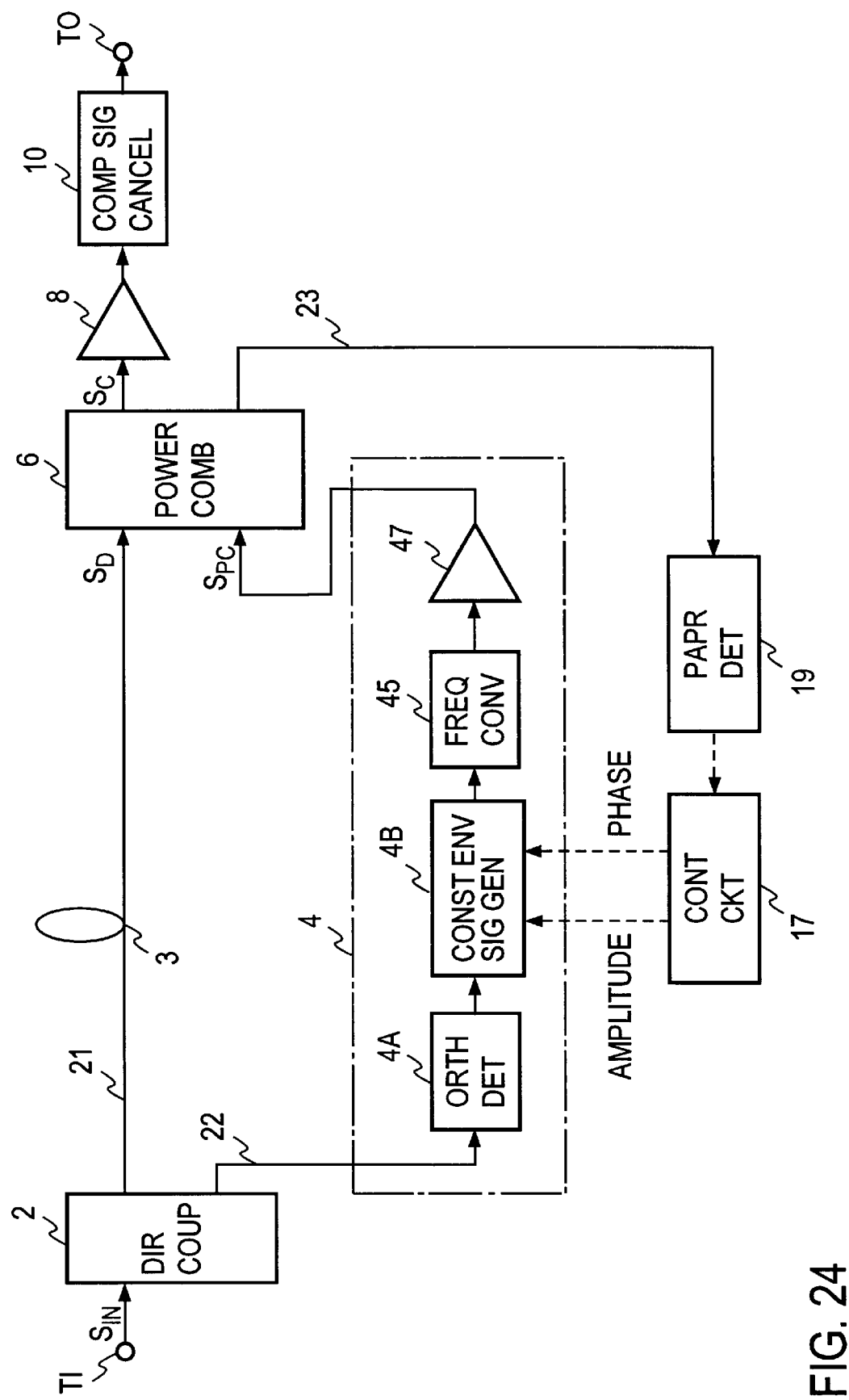
FIG. 24 is a block diagram illustrating a thirteenth embodiment of the present invention.

FIG. 24 illustrates in block form a thirteenth embodiment of the present invention, in which the compressing signal generator 4 is made up of the orthogonal detector 4A, the constant-envelope signal generator 4B, the frequency converter 45 and the amplifier 47.

The orthogonal detector 4A performs orthogonal detection of the input signal $S_{IN}$ to observe its vector (amplitude and phase values). The vector thus observed is set by the constant-element signal generator 4B to be nearly 180° out of phase with the amplifier input signal $S_{IN}$ so as to suppress it. The output from the constant-envelope signal generator 4B is frequency-converted by the frequency converter 45 to a predetermined band. In this instance, the output may be frequency-converted to a identical band with or different band from that of the input signal of amplifier. The frequency-converted compressing signal $S_{PC}$ is adjusted in level by the amplifier 47, and combined by the power combiner 6 with the signal $S_D$ from the delay line 3, and the combined signal $S_C$ is provided to the amplifier 8.

The control path 23 comprises the PAPR detector 19 and the control circuit 17. The PAPR detector 19 detects the peak power and average power of the combined signal distributed from the power combiner 6 and, when the PAPR is above a present threshold value, performs orthogonal detection of the combined signal to obtain its phase and amplitude. Based on the thus detected phase and amplitude, the control circuit 17 controls the amplitude and phase values of the constant-envelope signal generator 4B on a stepwise basis so that the PAPR goes down below the threshold value. The control circuit 17 is formed by a microprocessor, and uses a perturbation algorithm, least square estimation algorithm, or the like.

The control circuit 17 further controls the amplitude and phase values of the constant-envelope signal generator 4B in a manner to reduce the PAPR of the input signal to the amplifier 8 (which is the combined signal of the outputs from the linear signal transfer path 21 formed by the delay line 3 and the compressing signal generating path 22). The control of the constant-envelope signal generator 4B is equivalent to the suppression of the PAPR at the time of receiving the amplifier input signal $S_{IN}$ in the base band. The control operation in the base band allows control in the operating band broader than the modulation signal bandwidth. This permits simplification of the control circuit configuration. A tone signal may be used as the compressing signal, in which case the configuration of this embodiment need not be modified and the same results as mentioned above are obtainable as well.

While in the above the present invention has been described as being applied to the compression of the power dynamic range of the input signal to the power amplifier 8, the invention is not limited specifically thereto. By applying the invention to, for instance, the input of an A/D converter, its input range can be reduced through the compression of the power dynamic range of input signal thereto-this makes it possible to use an A/D converter that is simple-structured accordingly and hence is inexpensive.

EFFECT OF THE INVENTION

As described above, the signal power dynamic range compressing circuit according to the present invention does not clip the input signal, but instead generates a compressing signal based on the input signal and combines it with the input signal having passed through a linear signal transfer path to thereby compress the signal power dynamic range, and hence develops no out-of-band leakage of power. Further, since the phase of the compressing signal is set in accordance with the input signal, the compression of the signal power dynamic range can effectively achieve even in the case where the input signal is a modulated signal and its phase varies.

In the power amplifying circuit having a power amplifier connected to the output side of the signal power dynamic range compressing circuit, the provision compressing signal cancel means at the output side of the power amplifier makes it possible to achieve high-efficiency amplification that is completed within the transmitting side, without exerting the influence of the compressing signal on the receiving side.

What is claimed is:

1. A signal power dynamic range compressing circuit comprising:
   a directional coupler for distributing an input signal to two paths;
   a linear signal transfer path over which to linearly transfer the one distributed input signal;
   a compressing signal generating path for generating a compressing signal containing a component opposite in phase to the other distributed input signal; and
   a power combiner for power-combining output signals from said linear signal transfer path and said compressing signal generating path.

2. The circuit of claim 1, wherein said compressing signal generating path comprises:
   a level discriminator for detecting the peak power of said input signal above a predetermined level;
   a peak power detector responsive to the detection of said peak power to detect the phase of said input signal;
   a low-frequency oscillator for generating a low-frequency signal nearly 180° out of phase with said detected phase; and
   a frequency converter for converting said low-frequency signal to a desired frequency band and for outputting said frequency-converted signal as said compressing signal.

3. The circuit of claim 1, wherein said compressing signal generating path comprises:
   a level discriminator for detecting the peak power of said input signal above a predetermined level;
   a peak power detector responsive to the detection of said peak power to detect the amplitude of said input signal;
   a low-frequency oscillator having set therein said detected amplitude, for generating a low-frequency signal nearly 180° out of phase with the phase of said input signal; and
   a frequency converter for converting said low-frequency signal to a desired frequency band and for outputting said frequency-converted signal as said compressing signal.

4. The circuit of claim 1, wherein said compressing signal generating path comprises:
   a level discriminator for detecting the peak power of said input signal above a predetermined level;
   a peak power detector responsive to the detection of said peak power to detect the phase and amplitude of said input signal;
   a low-frequency oscillator for generating a low-frequency signal nearly 180° out of phase with said detected phase of said input signal;
   modulating signal generating means for generating a predetermined modulating signal;
   a modulation circuit for modulating said low-frequency signal by said modulating signal to generate a modulated low-frequency signal; and
   a frequency converter for converting said modulated low-frequency signal to a desired frequency band and for outputting said frequency-converted signal as said compressing signal.

5. The circuit of claim 4, wherein said modulating signal generating means is a code generator for generating a code of a specific pattern as said modulating signal.

6. The circuit of claim 2 or 3, wherein said compressing signal generating path further comprises a compressing signal adjustment part for controlling said low-frequency oscillator so that the peak power of said combined signal distributed from said power combiner goes down below a preset value.

7. The circuit of claim 6, wherein said compressing signal adjustment part comprises:
   combined signal level discriminating means for discriminating the level of said distributed combined signal above a preset value;
   a combined signal peak power detector responsive to the detection of said signal level above said preset value to detect a phase and amplitude of said combined signal; and a control circuit for controlling said low-frequency oscillator based on said detected phase and amplitude of said combined signal so that the level of said combined signal goes down to below said predetermined value.

8. The circuit of any one of claims 2, 3, and 4, wherein said frequency converter frequency-converts said low-frequency signal to a frequency band different from that of said input signal.

9. The circuit of any one of claims 2, 3, and 4, wherein said frequency converter frequency-converts said low-frequency signal to the same frequency band as that of said input signal.

10. The circuit of any one of claims 1 to 4, wherein said compressing signal generating path comprises a variable phase shifter for adjusting the phase of said compressing signal and variable amplitude means for adjusting the amplitude of said compressing signal, and which further comprises a compressing signal adjustment part for controlling said variable phase shifter and said variable amplitude means so that the peak power of said combined signal distributed from said power combiner goes down below a preset value.

11. The circuit of claim 10, wherein said compressing signal adjustment part comprises: combined signal level discriminating means for discriminating the level of said distributed combined signal above a preset value; a combined signal peak power detector responsive to the detection said signal level above said preset value to detect the phase and amplitude of said combined signal; and a control circuit for controlling said variable phase shifter and said variable amplitude means based on said detected phase and amplitude of said combined signal so that the level of said combined signal goes down to below said predetermined value.

12. The circuit of claim 10, wherein said compressing signal generating path further comprises a compressing signal adjustment part for controlling said variable phase shifter and said variable amplitude means so that the peak-to-average-power of said combined signal distributed from said power distributor goes down below a preset value.

13. The circuit of claim 12, wherein said compressing signal adjustment part comprises: peak-to-average-power ratio detecting means for detecting the peak-to-average-power ratio of said distributed combined signal above a preset value; and a control circuit responsive to the detection of said peak-to-average-power ratio of said combined signal above said preset value to control said variable phase shifter and said variable amplitude means so that said detected peak-to-average-power ratio goes down below said preset value.

14. The circuit of claim 1, wherein said compressing signal generating path comprises:

an orthogonal detector for performing orthogonal detection of said input signal and for outputting the phase and amplitude of said input signal;

a constant-envelope composing signal generator for inverting said detected phase of said input signal to generate an inverted-phase signal; and a frequency converter for converting said inverted phase signal to a desired frequency band and for outputting said frequency-converted signal as said compressing signal.

15. The circuit of claim 1, wherein said compressing signal generating path comprises:

an envelope detector for detecting the envelope of said input signal and for outputting the phase and amplitude of said input signal;

a constant-envelope composing signal generator for inverting said detected phase of said input signal to generate an inverted-phase signal; and a frequency converter for converting said inverted phase signal to a desired frequency band and for outputting said frequency-converted signal as said compressing signal.

16. The circuit of claim 14 or 15, wherein said compressing signal generating path comprises a variable phase shifter for adjusting the phase of said compressing signal and variable amplitude means for adjusting the amplitude of said compressing signal, and which further comprises a compressing signal adjustment part for controlling said variable phase shifter and said variable amplitude means so that the peak power of said combined signal distributed from said power combiner goes down below a preset value.

17. The circuit of claim 16, wherein said compressing signal adjustment part comprises: power ratio detecting means for detecting the peak-to-average-power ratio of said distributed combined signal above a preset value; and a control circuit responsive to the detection of said power ratio of said combined signal above said preset value to control said variable phase shifter and said variable amplitude means so that said power ratio goes down below said preset value.

18. A power amplifying circuit which uses said signal power dynamic range compressing circuit of any one of claims 2, 3, 14, and 15 and comprises said signal power dynamic range compressing circuit and a power amplifier connected to the output of said power combiner.

19. The power amplifying circuit of claim 18, which further comprises compressing signal cancel means connected to the output side of said power amplifier for canceling said compressing signal.

20. The power amplifying circuit of claim 19, wherein said compressing signal cancel means is a filter.

21. The power amplifying circuit of claim 19, wherein said compressing signal cancel means comprises: a directional coupler inserted between said compressing signal generating path and said power combiner, for providing said compressing signal to said power combiner connected to one output terminal of said directional coupler itself and for distributing said compressing signal to the other output terminal; a combined signal generator for generating, based on said compressing signal fed from said other output terminal of said directional coupler, a combined signal nearly 180° out of phase with said compressing signal; and a power combiner/distributor for combining said combined signal and the output from said power amplifier to provide the output from said power amplifying circuit.

22. The power amplifying circuit of claim 21, wherein said combined signal generator comprises a phase inverter for inverting the phase of said distributed compressing signal, a variable phase shifter for adjusting the phase value of said phase-inverted compressing signal, and variable amplitude means for adjusting the amplitude of said phase-adjusted compressing signal and for applying said amplitude-adjusted compressing signal to said power combiner/distributor, said power amplifying circuit further comprising a combined signal control circuit for detecting the peak power of the output signal from said power amplifying circuit distributed by said power combiner/distributor to detect the phase and amplitude of said distributed output signal at that time and for controlling said variable phase shifter and said variable amplitude means based on said detected phase and amplitude.

23. The power amplifying circuit of claim 21, wherein said combined signal generator comprises a phase inverter for inverting the phase of said distributed compressing signal, a variable phase shifter for adjusting the phase value of said phase-inverted compressing signal, and variable amplitude means for adjusting the amplitude of said phase-adjusted compressing signal and for applying said amplitude-adjusted compressing signal to said power combiner/distributor, said power amplifying circuit further comprising a combined signal control circuit for detecting the peak-to-average-power ratio of the output signal from said power amplifying circuit distributed by said power combiner/distributor and for controlling said variable phase shifter and said variable amplitude means so that said detected value of said peak-to-average-power ratio does not exceed a predetermined value.

* * * * *